(12) United States Patent
Malik

(10) Patent No.: US 6,611,517 B1
(45) Date of Patent: *Aug. 26, 2003

(54) METHOD AND APPARATUS FOR ESTABLISHING ASYNCHRONOUS FAX COMMUNICATION THROUGH ISDN

(75) Inventor: Naeem I. Malik, Fremont, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/374,842

(22) Filed: Aug. 16, 1999

(51) Int. Cl.[7] .............................................. H04L 12/66
(52) U.S. Cl. ...................................... 370/353; 370/264
(58) Field of Search ................................. 370/351–358, 370/264, 389, 395.2, 421, 422; 709/238, 249, 250

(56) References Cited

U.S. PATENT DOCUMENTS 5,018,191 A  *  5/1991  Catron et al. ............... 379/100
5,938,735 A      8/1999  Malik
6,304,579 B1 * 10/2001  Malik ......................... 370/432

\* cited by examiner

*Primary Examiner*—Wellington Chin
*Assistant Examiner*—Brenda Pham
(74) *Attorney, Agent, or Firm*—Oblon, Spivak, McClelland, Maier & Neustadt, P.C.

(57) ABSTRACT

A method, and apparatus in an ISDN system form a setup message at a source ISDN terminal where the setup message includes a resource coordination message containing the communication attributes of the source terminal. The ISDN source terminal sends the setup message to an ISDN switch, where the ISDN switch implements a central resource coordination mechanism that extracts the source terminal attribute information. The ISDN switch sends an inquiry message over a D channel to a destination terminal so as to ascertain the communication attributes of the destination terminal, which are reported to the ISDN switch in a reply message. In light of the communication attributes of the source terminal and destination terminal, the ISDN switch and central resource coordination mechanism therein, compares and allocates ISDN communication resources and identifies common attributes. Based on the common attributes, the ISDN allocates a B channel, or at least a portion of a B channel, so that a most efficient, and highest capacity communication link may be established between the source terminal and destination terminal.

20 Claims, 23 Drawing Sheets

FRAME FOR NSF, NSS AND NSC

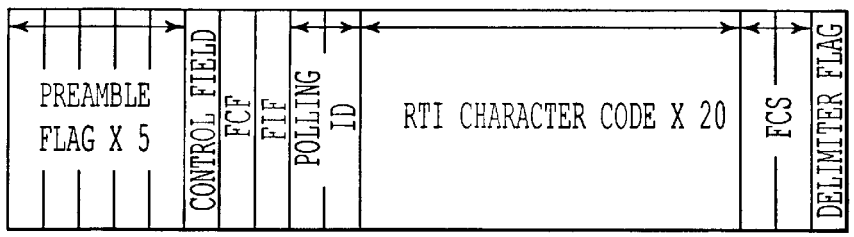

FIG. 15A
BACKGROUND ART

GENERAL COMMAND FRAME

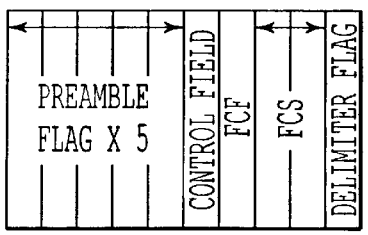

COMMAND DEFINITIONS

| FUNCTION | DESCRIPTION | SIZE |
| --- | --- | --- |
| FLAG | HDLC FLAG 01111110B | 8 BITS |
| CONTROL FIELD | INDICATES LAST FRAME (2FH) | |
|  | NOT THE LAST FRAME (OFH) | 8 BITS |
| FCF | COMMAND: FAX CONTROL FIELD | 8 BITS |
| FIF | FACSIMILE INFORMATION FIELD | 8 BITS |
| RTI | RECEIVER TERMINAL IDENTIFICATION | ASCII 20 BYTES |
| FCS | FRAME CHECK SEQUENCE CRC 16 | 16 BITS |
| POLLING ID | OPTIONAL | 16 BITS |

FIG. 15B
BACKGROUND ART

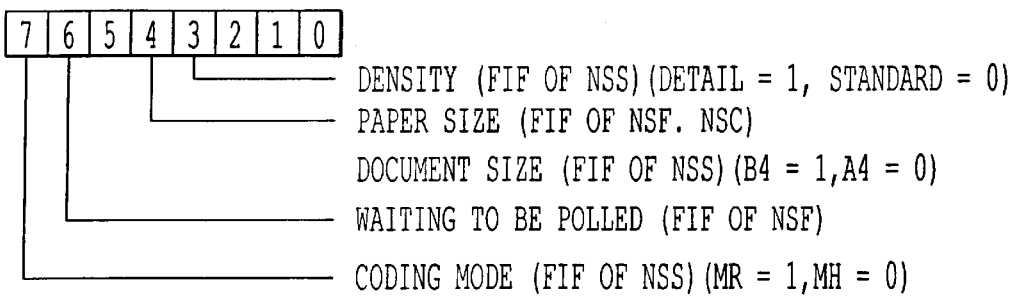

FIG. 15C BACKGROUND ART

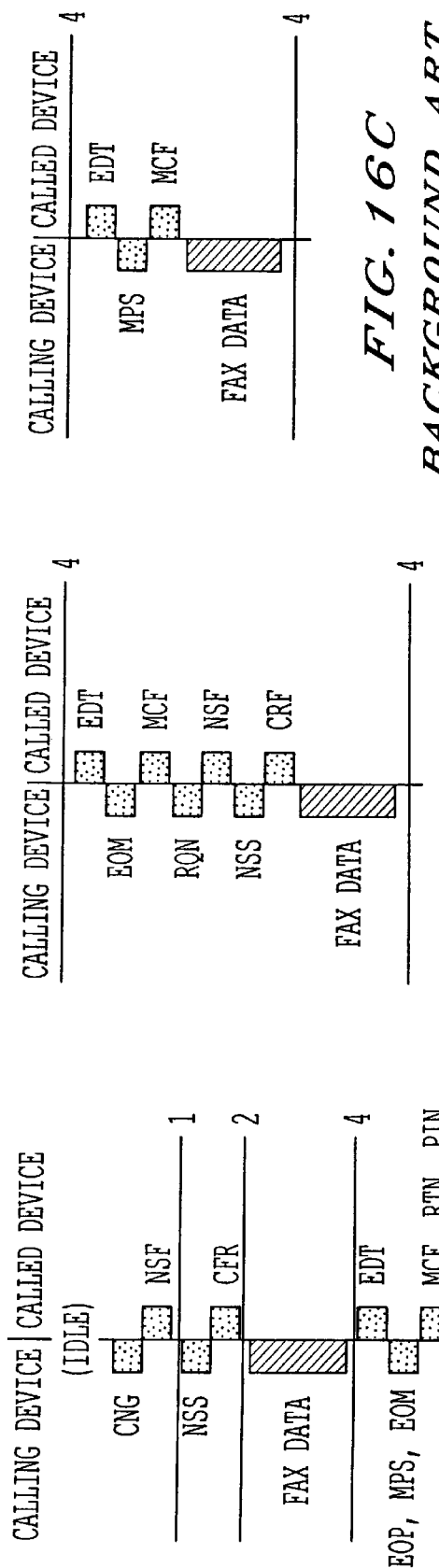

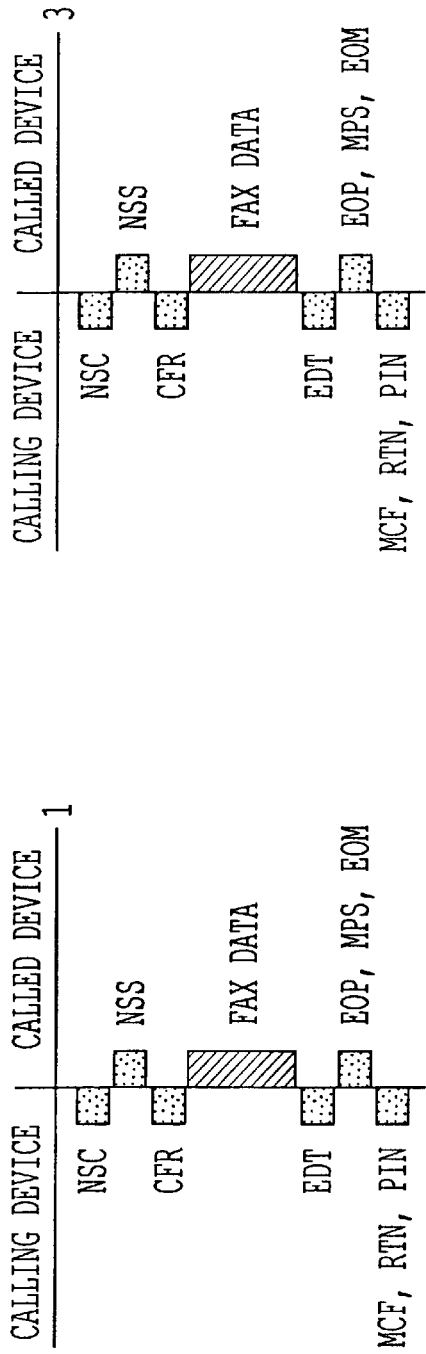
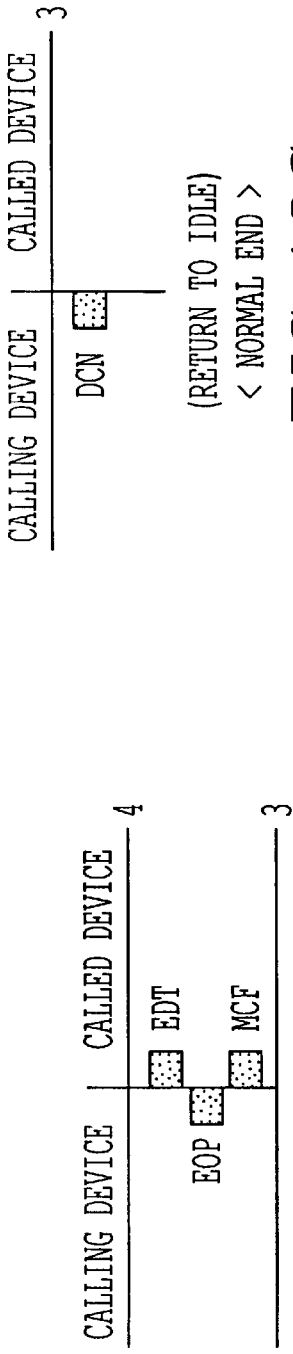
*FIG. 16D BACKGROUND ART*
*FIG. 16E BACKGROUND ART*
*FIG. 16F BACKGROUND ART*
*FIG. 16G BACKGROUND ART*

WHEN A COMMAND FROM THE CALLED
SIDE CAUSES CONSECUTIVE ERRORS

WHEN A COMMAND FROM THE CALLING
SIDE CAUSES CONSECUTIVE ERRORS

WHEN THE FIRST CFR CAUSES AN ERROR

ASYNC PROTOCOL OVERVIEW

| Symbol | Code | Function |
|---|---|---|
| CNG (Calling Command) | 00000001 | Transmission request issued by the calling device for the start of a transmission |
| NSF (Non-Standard Facilities) | 00000010 | Machine Functions (settings) of the called device sent to the calling device. |
| NSS (Non-Std Fac. Set-up) | 00000011 | Set-up data sent by the calling device to the called device. (Fac. = Facilities) |
| EOP (End Of Procedure) | 00000100 | Multi-page message is interrupted |
| MPS (Multi-Page Signal) | 00000101 | Indicates that the set-up data of the transmitter (e.g. Detail or Standard is the same as the setting for the previous page. |
| EOM (End of Message) | 00000110 | Indicates that the set-up data of the transmitter is different from the preceding page. |
| MCF (Message Confirmation) | 00000111 | Indicates that all fax data has been received without errors. |
| CFR (Confirmation to Rec.) | 00001000 | Standby to receive message. |
| RTN (Retrain Negative) | 00001001 | All fax data has not been received correctly. Line errors have been detected. |
| PIN (Procedural Interrupt Negative) | 00001010 | Fax data is not being received correctly. The Receiver requests the transmitter to stop. |
| NSC (Non-Std Fac. Cmd) | 00001011 | Machine functions (settings) of the calling device sent to the called device (i.e. receiver) |
| EDT (End Detection) | 00001100 | The end of the page has been detected. |
| CRP (Command Repeat) | 00001101 | Comand Repeat Request |
| RON (Request next Cmd) | 00001110 | Request to continue the following sequence. |
| DCN (Disconnect) | 10000111 | Negotiation Stop |

FIGURE 22

METHOD AND APPARATUS FOR ESTABLISHING ASYNCHRONOUS FAX COMMUNICATION THROUGH ISDN

CROSS-REFERENCE TO RELATED APPLICATION

This application contains subject matter related to that disclosed in commonly owned, co-pending, commonly owned applications Ser. No. 08/841,655 filed on Apr. 30, 1997 entitled "A Method And Apparatus For Routing Data Information Conveyed In A Facsimile Message", Ser. No. 08/955,353 entitled "Method and Apparatus for Establishing Optimized ISDN Communication Conditions", and "Method And Apparatus For Establishing Synchronous Fax Communication Through ISDN", filed the same day as the present document by the present inventor, the contents of each of which being incorporated herein by reference.

BACKGROUND OF THE INVENTION

1. Field of the Invention

The present invention pertains to asynchronous communication systems and methods for communicating information over an Integrated Services Digital Network (ISDN) network. In particular, the present invention pertains to establishing over an ISDN D channel an asynchronous communication link between a source terminal and a destination terminal via an ISDN switch, where the established communications link has communications attributes that are favorable to both the source terminal and the destination terminal.

2. Discussion of the Background

Conventional facsimile devices communicate over the Public Switch Telephone Network (PSTN) using analog signals that are transmitted over conventional telephone lines. The source terminal (e.g., a facsimile device, computer with scanner and modem facilities, or another device that transmits and/or receives data) converts digital scanned information into a corresponding analog signal so the same may be sent over the PSTN telephone line to the destination terminal. In turn, the source terminal receives the analog information and converts the analog information back into digital signals which form the basis of an image to be printed, perhaps on facsimile paper.

The Integrated Services Digital Network (ISDN) is evolving into a next generation worldwide public telecommunications network that will replace existing public switch telephone networks and provide a variety of services that are not offered by the PSTN. ISDN will allow the transmission of various types of data between various types of ISDN terminal equipment (TE).

A portion of the ISDN link between a source terminal and a central office, which has a switch facility, is referred to as a "digital pipe". A capacity of the pipe is generally discussed in terms of separate channels. In particular, a "basic access" digital pipe includes two B channels (basic channels) which support 64 kbps signaling, and a D channel at 16 kbps. While the total bit rate of these three channels is 144 kbps, framing, synchronization and other overhead bits bring the total bit rate of a basic access link to 192 kbps. However, the B channels serve as separate communication channels such that the maximum data capacity, as view by the user, is 64 kbps per channel, not 192 kbps.

The function served by the D channel, is twofold. First, the D channel is used to establish and maintain signaling between the user's equipment and the ISDN's switch (operated by the telephone company). Thus, the D channel carries signaling information such as that required for dialing the telephone number of the destination terminal and making the connection between the source terminal and the destination terminal. A more complete description of narrowband and broadband ISDN, as well as ISDN terminal equipment, protocols, data rates, etc. is provided in the literature, for example in Stallings, W., "Data and Computer Communications", $5^{th}$ Edition, Prentice Hall, 1997, pp 740–769 (hereinafter "Stallings") the contents of which is incorporated herein by reference.

FIG. 1 shows a conventional ISDN system where a source facsimile 10 at a source facility 1 communicates via an ISDN switch 22 to a destination facsimile 16 (or other type of destination terminal, such as a computer, ISDN equipped photocopier, etc.) in a destination facility 2. The source facsimile 10 communicates via a terminal adapter 10A, which is shown as an internal device, although a separate external terminal adapter may be used as well. The terminal adapter 10A provides a protocol (physical layer and intermediate layer) conversion function for converting signal protocol such as V.35, RS-232, Universal Serial Bus (USB), IEEE 1394 (FireWire), etc. to an ISDN compliant protocol over a 4-wire interface.

The source facsimile 10, terminal adapter 10A, and network termination (NT1) 14, are included at the users' source facility 1. The NT1 14 connects, via a two-wire line 15, to a switching module 26 located at the ISDN switch 22. Alternatively, a second network termination (NT2) may be used at the source facility 1 between NT1 and the terminal adapter to provide a switching and concentration function, such as with a digital private branch exchange (PBX). Likewise, the NT1 may be replaced with a NT12 that performs the functions of both the NT1 and NT2.

At the ISDN switch 22, the switching module 26 connects to a processor 24 and another switch module 28 via a bus 27, which allows digital commands and data to be passed between the respective switching modules 26 and 28, and processor 24.

The equipment at the destination facility 2 may or may not be exactly similar to that of the source facilities 1. It is assumed, however, that the source facsimile 10 and the destination facsimile 16 have no prior knowledge of the other's communication attributes. In the system shown at FIG. 1, the destination facility 2 includes the destination facsimile 16 having a terminal adapter 16A incorporated therein, which connects to another NT1 20 as shown. The NT1 20 connects to the switching module 28 in the ISDN switch 22, via another two-wire line 17 as shown.

ISDN communications is based on a seven layer protocol stack, as explained in reference to FIG. A.5 of Stallings, for example. Control signaling is accomplished between the respective user-network interface and occurs at a third layer of the protocol stack (i.e., the "network" layer) and is named I.451/Q.931. Thus, establishing and maintaining control signaling for a communication link established between the source facility 1 and a destination ISDN facility 2 through the D channel, and in particular, the ISDN network layer, data link layer and physical layer.

A link access protocol (LAPD) D channel is defined for establishing particular LAPD frames that are exchanged between the subscriber equipment (either at the source facility 1 or at the destination facility 2) and the ISDN switch 22. The call control protocol I.451/Q.931 is used on the D channel to establish, maintain and terminate connections on B channels.

FIG. 2 illustrates the signaling sequence between the source facility 1 and the ISDN switch 22. In order to establish a B channel connection between the source facility 1 and the destination facility 2, an initial communication link must be established on the D channel between the source facility 1 and the destination facility 2. To this end, a series of messages is sent back and forth between the source facilities 1 and the ISDN switch 22. This communication between the source facilities 1 and ISDN switch 22 occurs on a continuing basis on the D channel, while communications are maintained between the source facilities 1 and destination facilities 2 on the B channel. As shown in FIG. 2, several different messages are sent between the source facilities 1 and ISDN switch 22 while the D channel is maintained.

The direction of the arrows in FIG. 2, indicates a direction of communication between the source facilities 1 and the ISDN switch 22. The process for establishing a connection is initiated by the source facilities 1 by first sending a setup message. Particular features of the setup message will be discussed with respect to FIG. 3, however the purpose of the setup message is to provide general information regarding the request to connect to the ISDN switch 22. Next, the ISDN switch 22 responds with a call proceeding message that indicates that call establishment has been initiated. Subsequently, the ISDN switch 22, sends a connect message that indicates call acceptance by the source facilities 1. The source facilities 1 then sends a connect acknowledge signal that indicates the user has been awarded the call. When the user wishes to disconnect a call, the user sends a disconnect message via the source facilities 1 to the ISDN switch 22, requesting for connection clearing. In response, a release message is sent from the ISDN switch 22, indicating the intent to release the channel and call reference. In response the source facilities 1 issues a release complete message, indicating that the release of the channel and the call reference. Subsequently, the call and information flow through the B channel is terminated.

FIG. 3 shows the structure of a conventional ISDN D channel setup message. The setup message includes respective LAPD frames (e.g., 501, 503 . . . ) of different sizes (measured in octets). The message includes a flag frame 501 that is one octet in length, followed by a service access point identifier (SAPI) frame 503 having a command/response bit (CR) and address field extension bit (0). The SAPI frame 503 is joined with the terminal end point identifier (TEI) frame 505, each of which are one octet in length. A control frame 507, is one or two octets in length, and is followed by an information frame 509, which has a variable length between 0 and 128 octets. A frame check sequence frame 511 follows and occupies two octets in length. An end frame 513 serves as an end of setup message flag.

The SAPI frame 503 includes a first subfield "SAPI", that identifies a protocol layer-3 user, as well as subframes C/R and 0, that are used as a predetermined formatting feature of SAPI. The terminal end point identifier frame 505, is used to provide a unique terminal end point identifier that is used to identify the user's equipment. The control frame 507 defines the type of frame format that will be employed such as an information frame, supervisory frame, and unnumbered frame for example. The information frame 509, includes a variable number of octets varying from 0 to 128 and contains respective subfields that contain any sequence of bits that form an integral number of octets.

Thus, when a user wishes to send data to a destination, information in the information field is passed directly to the destination user without the ISDN switch deciphering the contents of the information. Following the information field 509, the frame check sequence 511 is included and forms an error-detection function by calculating a code from the remaining bits of the frame, exclusive of the flags. The normal code is a cyclical redundancy check code. Finally, the end flag frame 513, includes a specific code indicating the end of the setup message.

As identified by the present inventor, a limitation with the conventional ISDN setup architecture is that there is no suitable approach for coordinating, optimally, the communication attributes of the source terminal and the destination terminal on the D channel prior to allocating or using the B channels. Moreover, the ISDN switch, while being able to relay information directly to a destination terminal, passes this data on directly, without interpreting the data or the contents therein.

Furthermore, the conventional ISDN terminals and ISDN switch are not configured to perform a communication resource allocation and optimization process using the D channel so that while establishing the request for a particular B channel, the ultimate resources assigned by the ISDN switch to the source terminal and destination terminal are optimum based on the attributes of the source terminal and the destination terminal.

The present inventor also determined that the conventional approach for communicating over the ISDN channel is not well suited for older facsimile machines and other devices that send facsimile messages, perhaps by way of asynchronous communication protocols.

Furthermore, the present inventor determined that in order to accommodate different vintage source and destination terminals, there may be the possibility of manually, or alternatively automatically, configuring the communication parameters between the source terminal and the destination terminal so that a quick communication link may be established through the ISDN switch. A typical messaging sequence of a G3 facsimile machine that communicates to a called facsimile machine by way of a telephone network is shown in FIG. 13. The different acronyms used in FIG. 13 correspond with the acronyms and asynchronous protocol symbols shown in FIG. 22. FIG. 14 shows a communication sequence between a calling facsimile device and a called facsimile device on a telephone line, after which the facsimile devices return to an idle mode. FIGS. 15A–15C show respective frame structures used to specify non-standard facilities (NSF), the non-standard facilities set up (NSS) and the non-standard facilities command (NSC). Thus asynchronous communications may use these frames, as presently recognized, in an asynchronous communication session. FIGS. 16A through 16G show conventional communications sessions between a facsimile device (calling device) and a called device. The communications sessions shown in FIG. 16A relates to calling condition initiated from an idle line condition. The communication session in FIG. 16B relates to a situation where the non-standard facilities function is requested by the called device. FIG. 16C shows a communications session where a multi-page signal is sent by the calling device, informing the called device that several pages will be sent, where the set-up data is the same between the respective pages. FIG. 16D shows a communications session for a polling operation. FIG. 16E shows a communications session for a turn around polling operation, where FIGS. 16F and 16G show an end to the calling session between the calling device and the called device. FIG. 17 shows typical communications sessions for a fax PC link command exchange sequence. In particular, FIG. 17A shows a situation where a command from the called device causes consecutive errors. FIG. 17B shows a situation where the calling device causes consecutive errors in the transmission to the called device. FIG. 17C shows a situation where the first "confirmation to receive" signal is received in error by the calling device, and the technique for overcoming that particular error sequence.

The different protocols and signaling sequences in FIGS. 13–14 and 16A–16G and 17A–17c, are conventional approaches for communicating between a calling device and a called device, when conveying information between the two, over a conventional telephone line.

As presently recognized, limitations with the conventional communication sessions as discussed above, are that the communication terminals themselves may be better served by a communication channel that is adapted for the communication of information most efficiently between the calling terminal and the called terminal. However, conventional techniques do not enable the ability for the two terminals to agree upon a set of communication protocol features that will enable the most efficient communication between the two devices. It is presently recognized that if such a coordination mechanism were made available, it would be possible to employ older-style facsimile devices and other devices that send facsimile messages in a most efficient manner over an ISDN line via an ISDN switch.

SUMMARY OF THE INVENTION

Accordingly, one object of this invention is to provide a novel method, apparatus and system for establishing optimized communication conditions between an ISDN source terminal and an ISDN destination terminal that overcomes the above-mentioned limitations of existing methods, apparatuses and systems.

It is a further object of the present invention to provide a method, and apparatus, that employs a D channel of an ISDN basic service, for providing information to an ISDN switch regarding the communication attributes of the ISDN source terminal for establishing manually or automatically an asynchronous communication link between the source terminal and destination terminal.

Another object of the present invention is to provide a modified ISDN switch that is capable of identifying the communication attributes of the source terminal, and relaying a request message to the destination terminal, so that the ISDN switch can provide an optimal match of communications resources, based on the attributes of the source terminal and the destination terminal.

It is another object of the present invention to provide a computer-based apparatus and method that may be employed in ISDN user terminals, and related methods and processes provided at an ISDN switch, for identifying and coordinating attributes between a source terminal and destination terminal only on a D channel of an ISDN basic service.

It is a further object of the present invention to establish this optimization procedure on the ISDN D channel, before the B channel communication link has been established between the source terminal and the destination terminal.

These and other objects are achieved with the inventive method, apparatus and system, that forms a setup message at a source ISDN terminal where the setup message includes the communication attributes of the source terminal. The ISDN source terminal, relays the setup message with the attribute information to an ISDN switch, where the ISDN switch implements a central resource coordination mechanism that extracts the attribute information from the source terminal, and initiates communications over a D channel with a destination terminal so as to ascertain the communication attributes of the destination terminal. In light of the communication attributes of the source terminal and destination terminal, the ISDN switch and central resource coordination mechanism contained therein, compares and allocates ISDN communication resources for optimally using the attributes of the source terminal and destination terminal prior to the allocation of B channels, so that a most efficient, and highest capacity communication link may be established between the source terminal and destination terminal using the assigned B channels.

The present invention also includes a feature of permitting the source terminal and destination terminal to communicate over an asynchronous communication protocol, where attributes associated with the facsimile message (such as image resolution, number of black/white shades of the image, and number of shades of color features for the image to be transferred) are specifiable, either automatically through a terminal adapter, or manually, as requested by a user of the source terminal, for example. Manually establishing these particular parameters, enables a more rapid set up between the source terminal and destination terminal.

The present invention will require an addition to ISDN switch facilities that is not currently present. In particular, the ISDN switch processor, and computer based resources, must be modified so as to interpret, and make inquiries about the communication attributes of the source terminal and destination terminal, and subsequently allocate communication resources between the terminals so that optimal communication conditions may be established. In this way, the coordination between the resources is accomplished using the D channel, without requiring the additional time and resources at the source terminal and destination terminal using the B channel, so that calls may be established more quickly, and handshaking process between the source channel and destination terminal may be streamlined, for ultimately a lower cost service to the user.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 15A–15C correspond with command frame configurations including NSF, NSS, and NSC frames;

FIGS. 16A–16G are command exchange sequences between calling devices and called devices, according to conventional practice;

FIG. 22 is a figure that shows different asynchronous protocol symbols used in communication between the calling facsimile device and the called facsimile device.

DESCRIPTION OF THE PREFERRED EMBODIMENT

Figure 4:
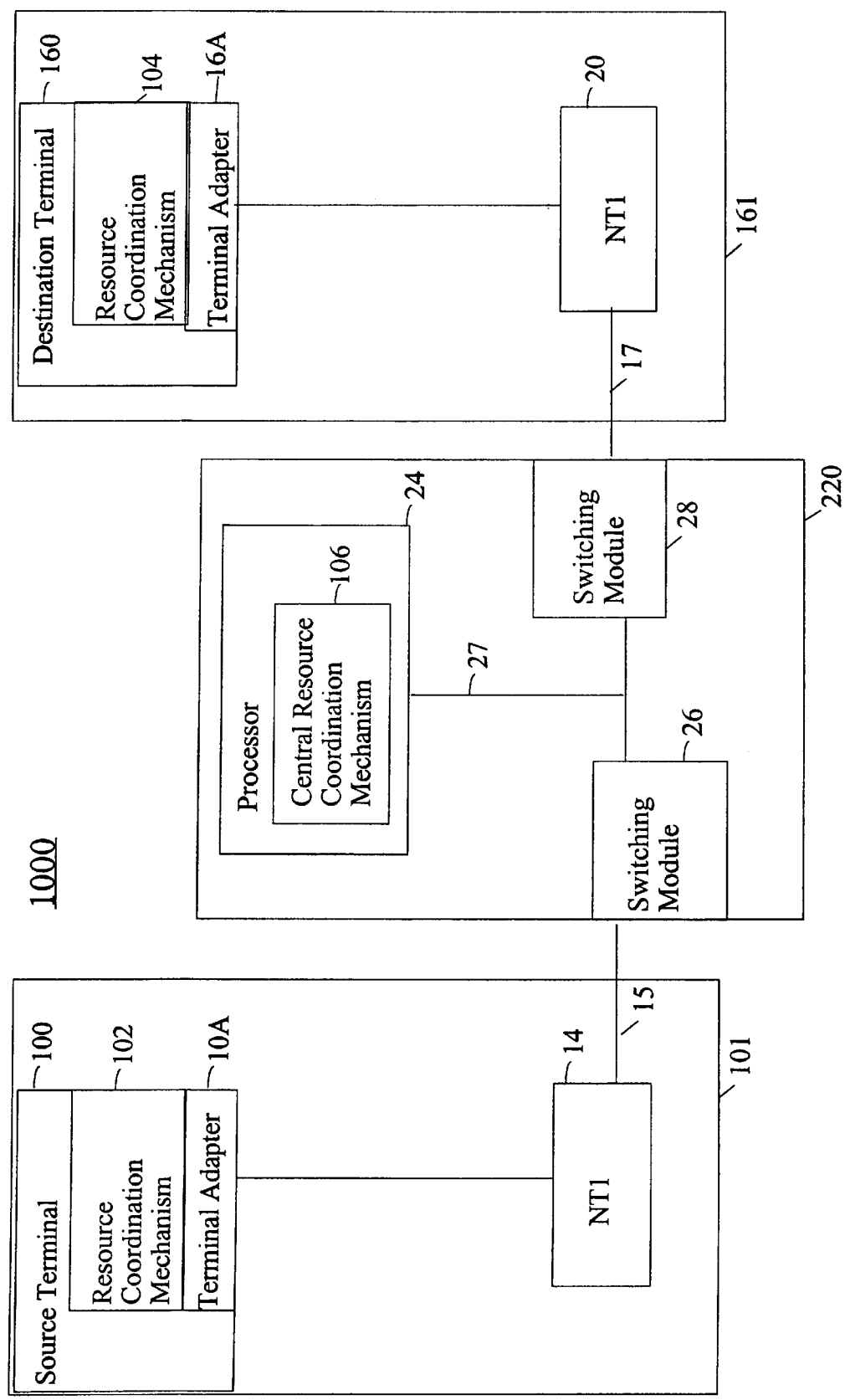
FIG. 4 is a block diagram of an ISDN system including resource coordination mechanisms according to an embodiment of the present invention.

Referring now to the drawings, wherein like reference numerals designate identical or corresponding parts throughout the several views, and more particularly to FIG. 4 thereof, there is illustrated an Integrated Digital Service Network (ISDN) system 1000 in which a source terminal 100 communicates with the destination terminal 160 via an ISDN switch 220. The source terminal 100 is included as part of a source facilities 101, located at a user site. The source terminal 100 includes a resource coordination mechanism 102, a terminal adapter 10A and network termination 1 (NT1) 14 (alternatively only a single NT1 is used at the source facilities 101 and the destination facilities 161). Connected to the NT1 14, is a two wire ISDN line 15 that connects the source facilities 101 to the ISDN switch 220. The ISDN switch 220 includes a processor 24 (e.g., one or more discrete central processing units), with associated memory (e.g., RAM, ROM, and/or mass storage), interface devices, etc, switching modules 26, 28 and bus 27. An example of a suitable processor 24 with switching modules 26, 28 is the 5ESS SWITCH available from AT&T, although appropriately modified to include the central resource coordination mechanism 106 as will be discussed herein. The second switching module 28 is connected via the bus 27 to the first switching module 26 and the processor 24. The second switching module 28 also connects to another two wire ISDN line 17, which in turn is connected to a NT1 20 of the destination facilities 161. The NT1 20 is connected to a destination terminal 160 having a resource coordination mechanism 104, and a terminal adapter 16A. The terminal adapter is shown to be an internal component of the destination terminal 160, although an external terminal adapter, as well as an external resource coordination mechanism 104 may also be used.

An example of the source terminal 100 or destination terminal 160 is a Ricoh FAX-4700L, which includes a G4 option, and Ricoh RS232PC-FAX expander, for example, appropriately modified to include a resource coordination mechanism, preferably accomplished as a computer based product. The source terminal 100 is configured to send information to the destination terminal in various forms, such as facsimile images through the G4 facsimile convention, audio, video, or other digital signals that are compatible with ISDN. As the channel capacity demanded by the type of information (say 1200 baud data, or MPEG 2 image files) varies from application to application. Accordingly, depending on the perceived percentage of channel capacity required by the source terminal 100 when preparing to send the information to destination terminal 160, the source terminal 100 may not require a full B channel to send the information. Furthermore, the source terminal 100 may have more advanced communication attributes than the destination terminal 160. Therefore, less than a full B channel may be required once a common set of communication attributes (as will be discussed) are identified by the central resource coordination mechanism 106.

The terminal adapter 10A, is a conventional device that converts between various types of signal formats. For example, the terminal adapter 10A receives a RS-232 output or a V.35 output from the source terminal 100 and converts the same into a four wire interface so as to be compatible with the conventional NT1 14. The resource coordination mechanism 102 will be discussed in more detail with respect to FIG. 5. The source facilities 101, complies with the D-channel call-control protocol I.451/Q.931 to set up the B channel connection with the destination terminal 160. In order to establish an optimum connection, the source facilities 101 initiates a resource coordination procedure with the ISDN switch 220, which in turn performs a similar resource coordination procedure with the destination facilities 161. The resource coordination mechanisms 102 and 104 of the source and destination terminal, respectively, as well as the central resource coordination mechanism 106 cooperate to identify the optimum resource allocation, as will be discussed with respect to FIGS. 5–7.

The destination facilities 161 includes the NT1 20, as well as a terminal adapter 16A and destination terminal 160 as shown. The resource coordination mechanism 104 at the destination terminal 160 is implemented in a similar manner to the resource coordination mechanism 102 at the source facilities 101.

The system 1000 begins operation by the source terminal 100 receiving an indication from a user that the user wishes to optimize communications between the source terminal 100 and destination terminal 160 while establishing a B channel connection to the destination terminal 160.

Optionally, the user will not be asked whether the user would like to optimize the communications to the destination terminal 160, but rather, the optimization is performed automatically, without further user input. In the present embodiment, however, the user indicates the user wishes to optimize communications by responding to a prompt on display of the source terminal (as will be discussed with respect to FIG. 5). In response, the processor-based resource coordination mechanism 102, retrieves from memory (RAM, ROM, or externally) the communication attributes associated with the source terminal, such as a type of communication the source terminal wishes to establish (synchronous versus asynchronous), a protocol type such as modified G3 (e.g., the Image Data Interchange, IDI), VT (e.g., from Val-U-Teak), MIL-STD 161A, B, C, etc., speed of communication, such as 2.4K, 4.8K, 9.6K, 14.0K, 19.2K, 32.0K, 48.0K, 56.0K, 64.0K, 128.0K, or other.

With regard to the IDI protocol, this protocol is implemented in conventional Ricoh facsimile devices, and a Ricoh Fax-PCLink Microcomputer Software, offered by Ricoh. The IDI protocol was developed to achieve compatibility with a large number of existing digital data networks while retaining features and conventions of G3 facsimile terminals. The IDI protocol generally resembles and follows many of the conventions of the G3 (T.30) facsimile protocols. The IDI protocol reflects however, the differences between data and voice networks and represents a redesign and simplification of the CCITT T.30. As a result, this protocol differs from, and is not compatible with, the T.30 protocol used for its facsimile communications in the PSTN.

Terminal to terminal image communication process is established in accordance with an asynchronous protocol which is supported by some conventional data communications hardware, such as facsimile devices and personal computers, for example. This protocol was selected with an asynchronous data link control conversion for the fax and fax-PCLink software because of its compatibility with a wide variety of network hardware. The asynchronous protocol also allows the facsimile devices and personal computers running the Fax-PCLink software to sense line connections and link establishment, so as to disconnect upon completion of communications sessions. Addressing of remote terminals is accomplished directly through the ISDN switch. The terminal utility, which is also used for fax operator interaction with computer-based software, is available but not discussed herein, nor is the display or printer driver features.

Facsimile terminals in conventional telephone networks place calls to remote terminals and transmit image data generated by the facsimile terminal scanner without interruption. These devices need not, and do not, respond to control signals in the voice network. Data networks on the other hand generally present terminals with a variety of delays, which normally require transmitting terminals to pause occasionally when transmitting large amounts of data and to wait for variable time periods for responses from the remote devices. The Fax and Fax-PCLink software overcomes most of the network delays by responding to flow control signals from the devices and is used to interface the terminal to network communication facilities. In addition to hardware flow, however, new commands have been added to those in the G3 T.30 protocol for communications sessions in the telephone network. But in the present case, in which the ISDN network is used, these commands are not needed but only when accessing an analog call. Therefore, these new commands are not needed when establishing a link on the ISDN channel.

The G3 T.30 (for PSTN applications) protocol assumes that delays of more than a few seconds will not occur during communications sessions. For example, it is assumed, at the transmit side, that when one page of compressed data is sent, the received side will process the compressed data in a first-in-first-out (FIFO) buffer within 3.5 seconds which corresponds with Ricoh standard compression and detail mode. Negotiation can therefore be started if the transmit side starts a post message protocol sequence to the received side within a 3.5 second period. In the telephone network, the transmit side typically performs a retry if there is no response from the received side within three seconds or four seconds after sending a command. By processing a command error which occurred on a transmit side as no response, the receive side assumes the transmit side will send the same command again. The negotiation sequence is based on the use of synchronized timers on both sides. Because longer delays of variable duration are common in data networks, the timing assumptions, which the CCITT fax protocols make about the telephone network cannot be applied.

Regarding command differences, the T.30 facsimile information fields (FIF) of the non-standard facilities set up (NSS) and the non-standard facilities command (NSC) used by the T.30 are simplified in the asynchronous protocol and many of the commands required for the PSTN, such as DIS, DCS (the digital command in identification signals) and DTC (digital transmit command) do not exist in the Fax-PCLink or in the compatible Ricoh fax protocol. The variety of delays common in many data networks also require the addition of new commands (i.e., not found in T.30) in the standardization of commands which in the telephone network are optional. Two new commands include EDT (referring to end detect), and RQN (referring to request next command). Standardized commands that were previously optional include CNG (referring to calling request), and CRP (referring to command repeat, at the received side only).

Because the present communication channel between the source terminal and the destination terminal are by way of an ISDN network, selected commands and responses, for the IDI protocol will not be required. For example, the CNG will not be required in the ISDN network, which is in contrast to its usage in a conventional PSTN network. Furthermore, the NSF/NSS command will not be required for repetition in error because an ISDN error will be checked much ahead of the communication and thus the error will not pass through the other end. Furthermore, the CPR and RQN commands will not be used in communication while in the ISDN call format. While communicating via a 3.1 KHz mode on analog line, these protocol commands will be activated and passed along for keeping in check the data accuracy. The assurance of call appearance for a correct call is defined in the D-channel for the ISDN data call and then for the ISDN analog call.

The source terminal 100 after forming a setup message that includes the communication attributes, as will be discussed, sends the information in a setup message through the terminal adapter 10A, NT1 14 and to the ISDN switch 220 via the line 15. Optionally, the user or the source terminal 100 may provide only a subset of its available communication attributes because the user or the source terminal 100 may have a preferred set of attributes that are desired to be used in the communication with the destination terminal 160; in this way, the user of the source terminal maintains control of the B channel resource allocation based on attributes forwarded to the switch 220, rather than the switch 220 making the decision regarding the B channel resource allocation based on all possible communication attributes supported by the source terminal 100.

As a further option the user may direct the terminal adapter 10A to operate either in a manual mode or an automatic mode. In the automatic mode, the terminal adapter 10A coordinates with the switch 220 so as to determine the appropriate set of communication parameters for communicating information between the source terminal 10 and the destination terminal 160. In the manual mode the user of the source terminal 100 may input specific communication parameters to be employed in communicating with the destination terminals. This manual option allows a user to select limited speeds and resolutions for example, so as to allow for rapid set up of the ISDN communication channel, which is a possibility particularly if the source terminal is already aware of the destination terminal 160's functional attributes. As a further alternative to this option, the manual mode of operation may include an override function, that allows the user to select the different communication parameters, but also requests that the ISDN switch 220 confirm that the destination terminal 160 is capable of handling the communication parameters identified by the user of the source terminal 100 when establishing the ISDN communication link. This manual option allows for the supporting of older facsimile devices, that may be compatible with the terminal adapter 10A, which is shown to be contained within the source terminal 100, but optionally may be simply connected externally thereto.

In response to receiving the setup message at the switch module 26, the ISDN switch 220 passes the message to the processor 24, where the communication attributes included in the setup message are extracted and analyzed by the central resource coordination mechanism 106. The central resource coordination mechanism 106 then stores the communication attributes in RAM, and initiates an initial communication query to the destination terminal 160, via the switching module 28, ISDN line 17, NT1 20, and terminal adapter 16. Once the destination terminal 160 receives the communication query message, the destination terminal 160 retrieves from memory a listing of communication attributes associated with the destination terminal 160, and includes these attributes in a reply message to the processor 24. As with the source terminal 100, the destination terminal 160 may also elect to only provide a subset of its communications attributes offered by the destination terminal 160. This subset may be performed automatically, or as a result of user-preferred options.

In response to the reply message, the processor 24 extracts the communication attributes from the destination terminal 160 and compares the same with the attributes from the source terminal 100. (As an alternative, the processor may also pass the attributes of the destination terminal to the source terminal 160 so the source terminal 160 may identify the optimum channel characteristics). In this comparison, the processor selects the most efficient communication attributes, which are often the attributes that will lead to the speediest communication, or minimum bandwidth used if the B channel will be further divided, that are in common with the source terminal 100 and destination terminal 160. In light of having identified the most efficient attributes, the central resource coordination mechanism 106 then informs the processor of a request for B channel allocation (e.g., a full B channel or a partial B channel) so communication between the source terminal 100 and the destination terminal 160 may commence. Using this approach allows the source terminal 100 and destination terminal 160 to use only those channel resources that the terminals can use to their fullest, but it also allows the users to establish the connection over the lower cost B channel so that the more expensive, and capable, B channel is not used during initial "handshaking" operations.

As an example, suppose the source terminal 100 is configured to communicate either synchronously or asynchronously, preferably employs a MIL-STD 161A, B, C, although also supports VT (Val-U-Teac) protocol, as well as Modified G3 (IDI) protocols, and includes a range of communication speeds up to 120 Kbps. However, the destination terminal is a device that may only communicate synchronously, uses only modified G3, and has a low data rate of 2400 bps. According to the above described coordination process, the processor 24 will identify the common attributes of the source terminal 100 an destination terminal 160 and allocate B channel resources required to provide the synchronous communication using the modified G3 protocol at 2400 bps. If the B channel cannot be further subdivided, then the remainder of the B channel may not be used, unless the Terminal Adapter 16A, is adapted to function as a "brouter" (i.e., a device that functions as a bridge and a router) which allows the destination terminal 160 to operate at a different data rate, and perhaps a different protocol, than between the destination facilities 161 and the switch 220. Similarly, the brouter (i.e., as embodied in the terminal adapter) may connect to other destination terminals as well so that portions of the B channel may be used for simultaneously communicating with different destination terminals 160 connected thereto, although not expressly shown.

The above described coordination process is performed completely over the D channel, without requiring the B channel for the initial setup of the system 1000. Furthermore, by allocating an optimum amount of communication resources to satisfy the best common communication attributes of the source terminal 100 and destination terminal 160, judicious allocation of available ISDN communication channels is made such that additional bandwidth is not wasted for source terminal 100 and destination terminals 160 who cannot communicate to the full communications capacity. Thus, the more efficient communication through the ISDN network 1000 is achievable compared with conventional devices. Furthermore, the user need not expend additional time, and thus greater expense, using the wider bandwidth B channel in order to establish the handshaking protocols for identifying common communication attributes between the source terminal 100 and destination terminal 160.

The present system includes the feature of the source terminal 100 requesting over the D channel only a fraction of a B channel (e.g., 10 kbps). Unlike traditional ISDN switches the processor 24 in the switch 220 is software configured to receive the request, determine if the called party has the requested fraction of a B channel available, and if so, allocate to the source terminal 100 a particular 10 kbps subset of the 128 kbps available on the two B channels for the requested communication. The switch 220 similarly informs the destination terminal 160 of the allocated 10 kbps "subchannel". Subsequently, the source terminal 100 and destination terminal 160 communicate using the subchannel (i.e., the allocated portion of the B channels), where the switch 220 performs the function of switching the subchannel. On the other hand, if the destination terminal does not have available 10 kbps (perhaps because all, or nearly all, of the B channel capacity is being used by the destination terminal 160 for other calls), the processor 24 will inform the source terminal 100 that the destination terminal 160 is not currently available by sending a busy signal.

In order to implement "subchannels", the source terminal 100, destination terminal 160, and switch 220 are configured to communicate over the D channel particular allocation requests. Furthermore, the terminals 100, 160 are configured to convert low data rate source signals (e.g., compressed video or audio signals) into channel symbols that are compatible with existing 64 kbps signaling on the respective B channels. Thus, source data rates of say 10 kbps, are transmitted as the first 10 k symbols in a 64 kbit B channel block. To this end, the B channel may be partitioned, in time, to accommodate multiple data sources provided by the source terminal, where the maximum number of data sources is limited by the availability of an unused portion of the 128 kbps channel (i.e., 128 kbps because two B channels are available for use in basic ISDN service, however greater channel capacity, and thus more subchannels, are available for ISDN primary services).

Each of the subchannels allocated by the switch 220 to the source terminal 100 may be used to establish communications with different destination terminals 160. This is accomplished by the source terminal 100 requesting on the D channel a particular destination terminal (e.g., requested in the form of a telephone number) and an amount of channel capacity (expressed in a number of kbps) to be used in communicating with the destination terminal. In turn, the switch 220 identifies whether sufficient capacity is available at the source terminal 100 and the destination terminal 160 to support the request, and if so, the switch 220 establishes the connection in the form of a subchannel. The switch services the subchannel by extracting the allocated block of bits (e.g., 10 kbps allocated to the subchannel) from the 128 kbps sent from the source terminal 100 and routes this block of bits to the destination terminal. Responses from the destination terminal are handled in a similar manner. Because the switch 220 handles one subchannel independently of other allocated subchannels, the source terminal 100 may adaptively establish multiple subchannels to a same or different destination terminals.

Figure 5:
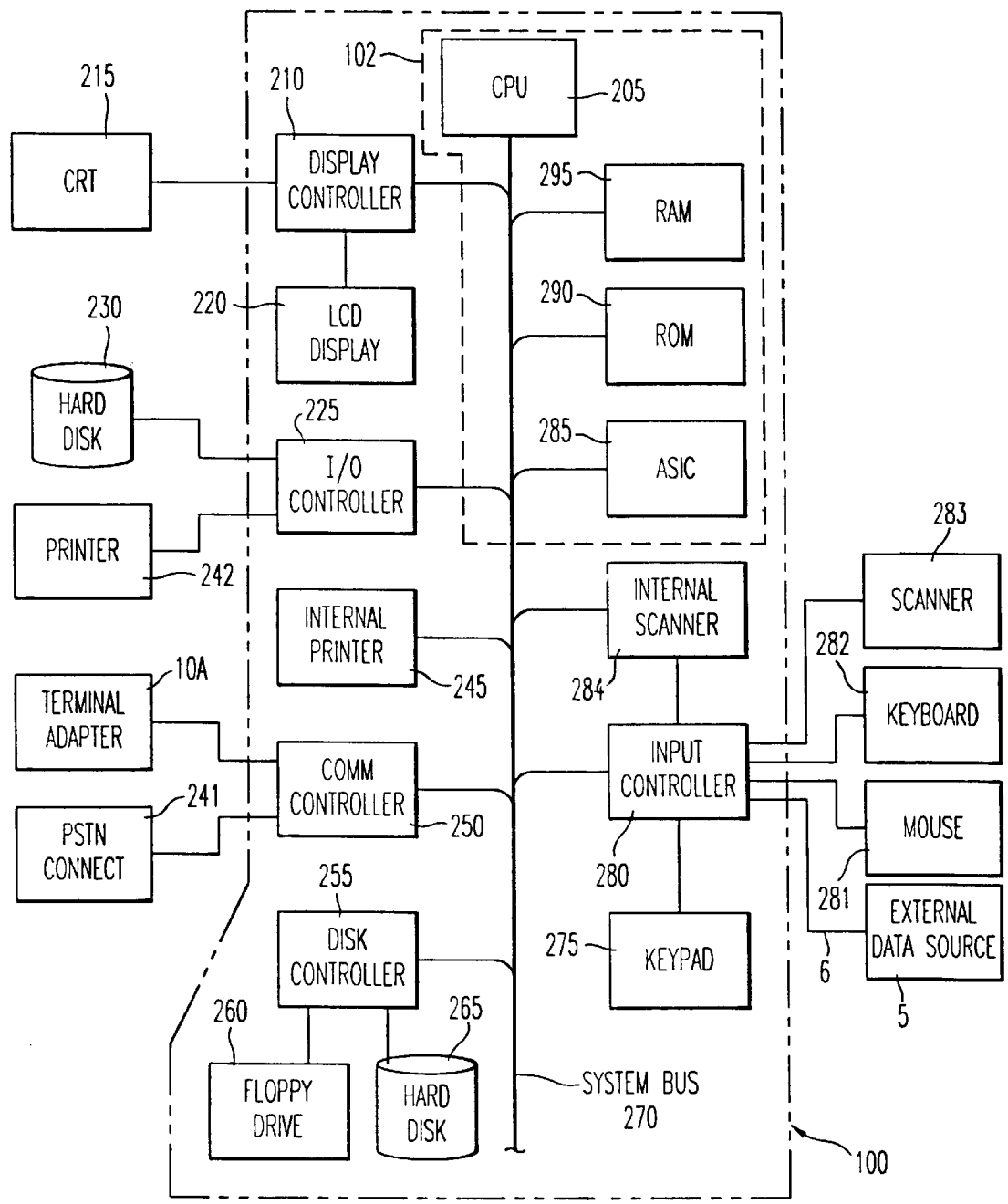
FIG. 5 is a block diagram of components of an ISDN source terminal according to the system of FIG. 4.

FIG. 5 illustrates an exemplary source terminal 100, with preferred features therein, where the destination terminal 160 will include similar components. The source terminal 100 is connected to the terminal adapter 10A, which may be included internally or externally, and the terminal adapter 10A may also include brouter functions, as previously discussed. The source terminal also connects to a PSTN connection 241, so that conventional communications may be sent over analog lines, if necessary. An external data source connection 5 is shown to connect to the source terminal 100 via an external interface 6, where the external data source 5 provides digital data or analog data (which is then digitized by the source terminal 100 with an analog to digital converter contained therein) to the source terminal 100 for inclusion in messages sent to the destination terminal 160. The external data source may be any type of data source that would benefit from transferring data to a remote location. Examples of external data sources 5 include a printer, digital camcorder, digital camera, digital versatile disk (DVD), digital video cassette recorder, CD player, digital telephone, computer and a photocopier.

The external interface 6 is a digital bus (e.g., serial or parallel) when the source terminal 100 receives digital data through a respective connector(s) formed therein. In particular, example external interfaces 6 include universal serial bus (USB), EIA-232, ISDN (ISO 8877), or IEEE 1394 ("Firewire") as described in Wickelgren, I., "The Facts About Firewire", IEEE Spectrum, April 1997, vol. 34, No. 4, pp 19–25, the contents of which are incorporated herein by reference. When receiving analog data, the external interface 6 is configured as a coaxial cable, a twisted pair, or an optical fiber (for example) as the source terminal 100 includes a respective connector for receiving the analog signals.

Because the source terminal 100 is configured to receive information from the external data source 5 via the external interface 6, the source terminal 10 provides a conventional facsimile function and a significantly different function than conventional facsimile devices. In particular, the source terminal 10 of FIG. 5 also serves as a general purpose communications resource that is capable of transmitting data from various types of external data sources 5 to remote terminals. In a reciprocal manner, the source terminal 10 is equipped to receive data from another terminal (e.g., destination terminal 160) and provide the data to the external data source 5 for display thereon or for use therein.

The structure of the source terminal 100 as shown in FIG. 5, also suitably describes the destination terminal 160, and general features of the processor 24 that would be employed in the ISDN switch 220, although appropriately adapted for an ISDN switch application as will be appreciated by one skilled in the ISDN art. A system bus 270 interconnects a variety of components that populate the system bus 270. A central processing unit (CPU) 205 provides general purpose control of the source terminal 100, as well as bus administration functions for the system bus 270. The CPU 205 has available to its system random access memory (RAM) 295 for temporary storage use and for holding communication attributes of the source terminal 100, which are downloaded upon system boot-up from ROM 290, or input alternatively by the user either during initial setup (with battery backup), or on an as per use basis. The non-volatile ROM 290 also holds the control program and fixed parameters. An application specific integrated circuit (ASIC) 295 is provided for performing specialized data manipulation functions, which could be adapted to serve as the entire resource coordination mechanism 102, although in the present embodiment, most of the resource coordination mechanism is performed in the CPU 205 by the execution of a resource coordination software-based process. As shown, the resource coordination mechanism 102 is identified by the dash line in FIG. 5 and includes the CPU 205, RAM 295, ROM 290, and ASIC 285. However, because the resource coordination mechanism 102 is largely computer-based, a subset of the components shown in FIG. 5 or additional components may be included as part of the resource coordination mechanism 102.

As an alternative to the ASIC 285, other data manipulation devices such as field programmable gate arrays (FPGA, not shown), programmable logic devices (PLD, not shown) and other processing units (such as digital signal processing chips, not shown), may also be used. Also available as system resources are a disk controller 25, which controls an internal floppy disk 250 and a hard disk 265, and an input/output (I/O) controller 225, which controls an external hard disk 230 and an external printer 242. Either the external printer 242 or an internal printer 245 may be used to print text and data files output by the source terminal 1100.

An input controller 280 is included and which controls an internal scanner 284, an optional external scanner 283, an external keyboard 282, an external mouse 281, and an internal keypad 275. Under control of the input controller 280, either the internal scanner 284 or the external scanner 283 may be used to capture an image of an object document and convert the image into a digital data stream that is passed through the input controller 280 to the system bus 270 for further processing. The input controller 280 also receives input from the keypad 275, which serves as a data input device for the source terminal 1100, although the keypad 282 and the mouse 281 serve as alternative input devices.

The input controller 280 also provides the interface (at a connector formed thereon) to the external interface 6 which interconnects the external data source 5 to the source terminal 100. For supporting digital signals, the input controller 280 includes interface logic that supports a FireWire interface or another interface standard such as USB, if another interface is used. When analog signals are provided, the input controller 280 includes an analog to digital converter (ADC) and digital to analog converter (DAC) for converting the external signals between the analog and digital domains. Data that is input to the external interface 6 is passed over the system bus 270 and stored in the RAM 295, where the data is later used by the CPU 205 and preparing the resource coordination message.

A display controller 210 is used to control either, or both, of an external cathode ray tube (CRT) display 215 and an internal liquid crystal display (LCD) 220. Other displayed formats would also be suitable, including plasma displays, an active and passive light emitting diode (LED) displays, etc. The displays 215 and 220, in tandem with the keypad 275, the keyboard 282, and the mouse 281, serve a user interface function.

A communications controller 250 also resides on the system bus 270 and connects to the terminal adapter 10A. As discussed previously, the communication controller 250, and outputs information to the terminal adapter 10A according to RS232, V.35 or other data communication arrangement. The connection to the PSTN, is a RJ-11 connection, although other connections are possible such as a second ISDN connection, via another terminal adapter, etc., or a wireless access provider connection, for example.

Figure 6:
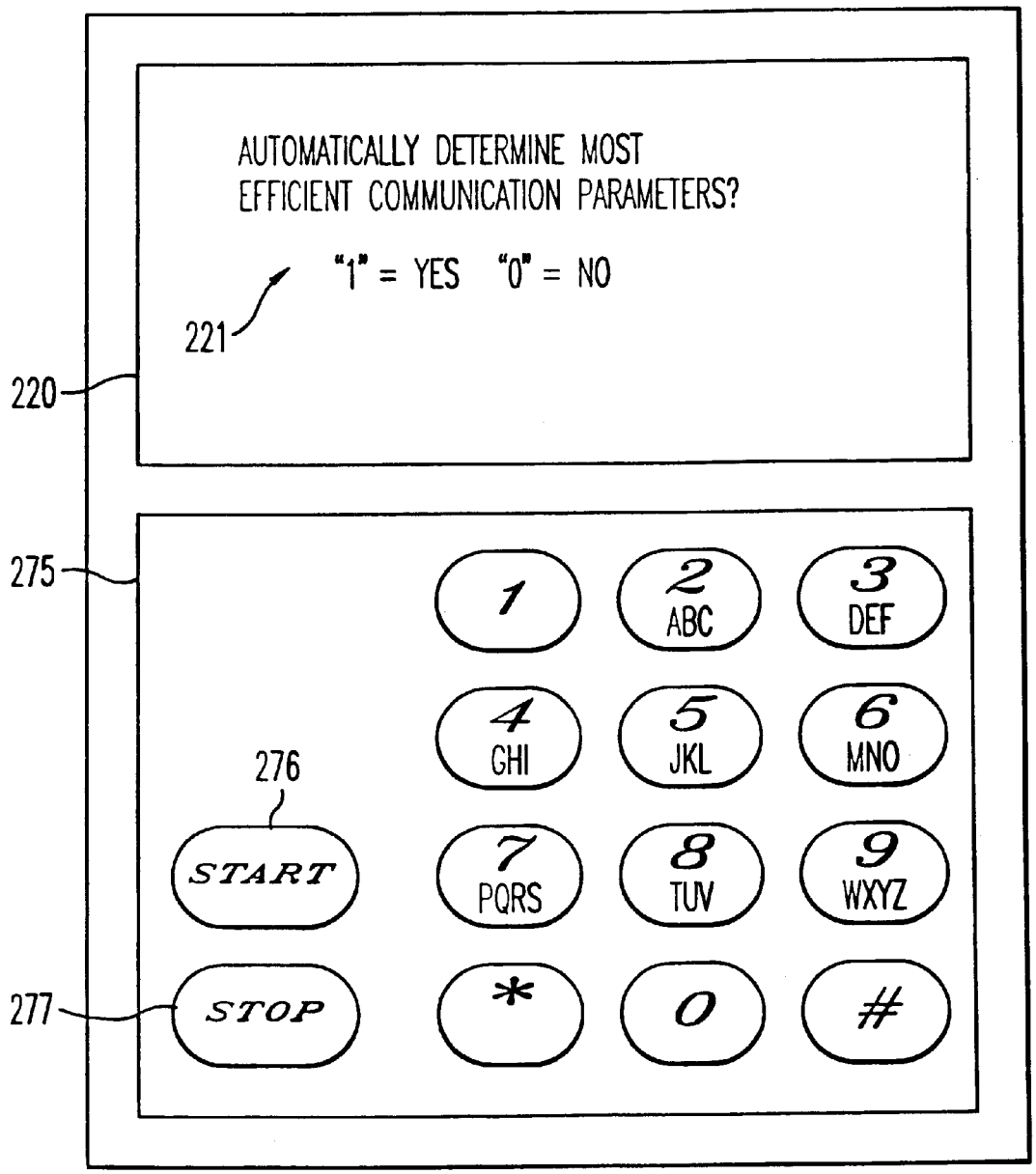
FIG. 6 is a plan view of a display in a keypad of a source terminal as shown in FIG. 4.

FIG. 6 illustrates the display 220 and the keypad 275 of the source terminal 100. The keypad 275 includes a 12-digit numeric keypad, a "start" key 276 and a "stop" key 277. Data that is input by a user on the keyboard 275 is echoed (i.e., displayed) on the display 220 so that the user knows what the user entered at any given time. In addition, the display 220 also includes text, generated by the source terminal 100 which "prompts" the user to enter specific information at a specific time. For example in FIG. 6, the display 220 is prompting the user to enter a "1" if the user wishes to automatically determine a most efficient communication parameter, or enter "0" if the user chooses not to perform a process for determining the most communication parameters.

Figure 1:
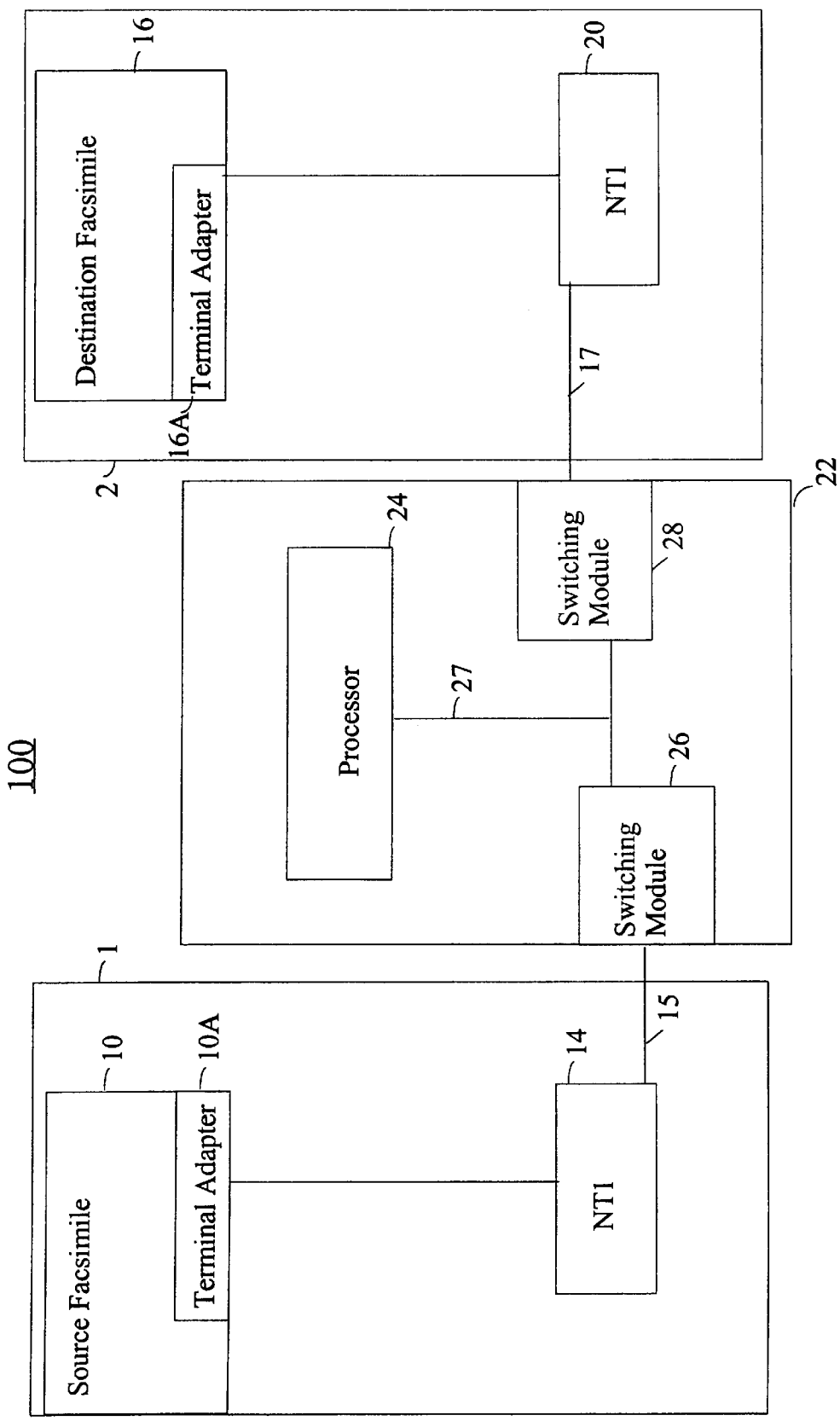
FIG. 1 is a block diagram of a conventional ISDN communication system.
Figure 2:
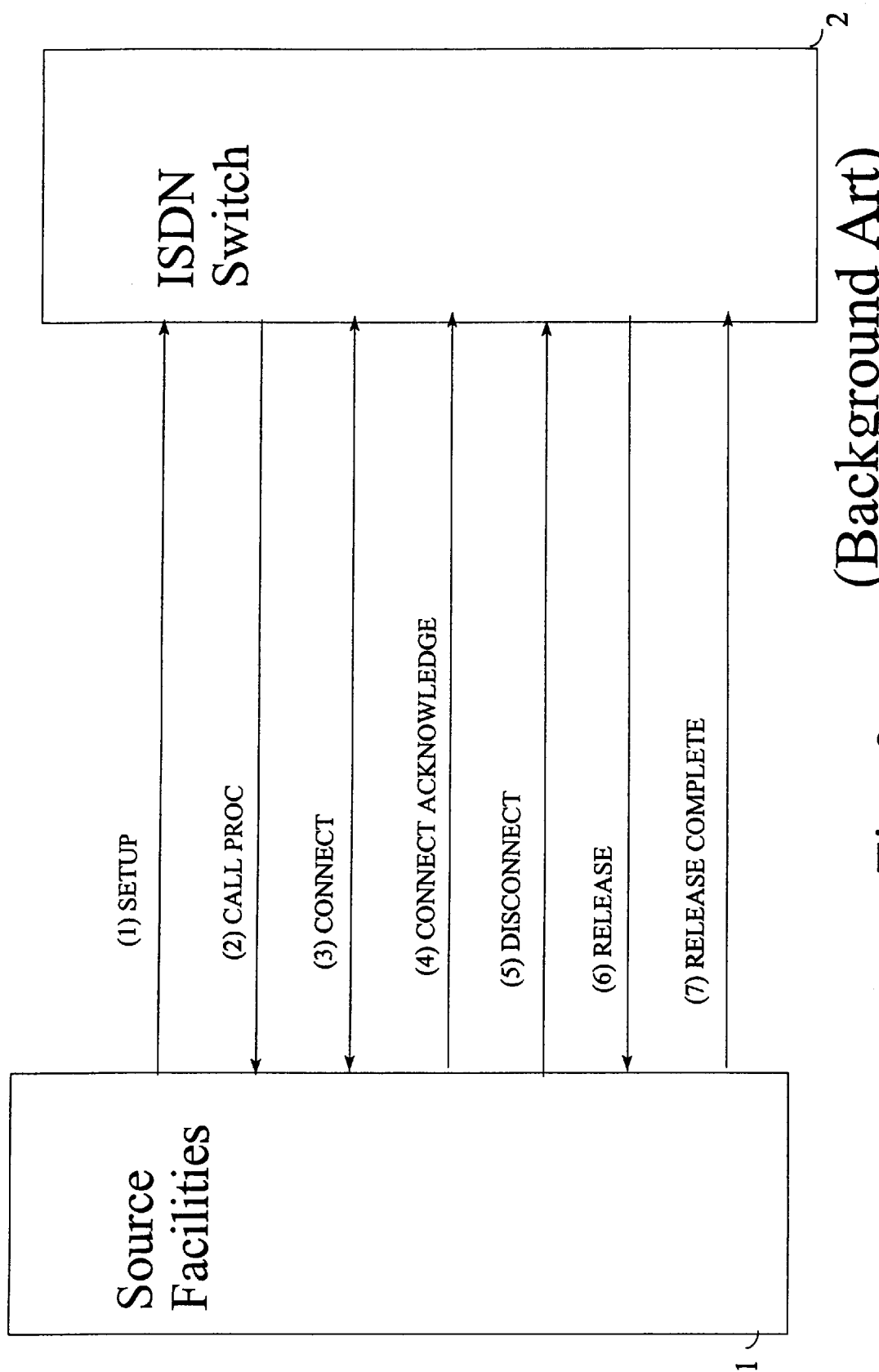
FIG. 2 is a conventional control signaling protocol for ISDN basic services.
Figure 3:
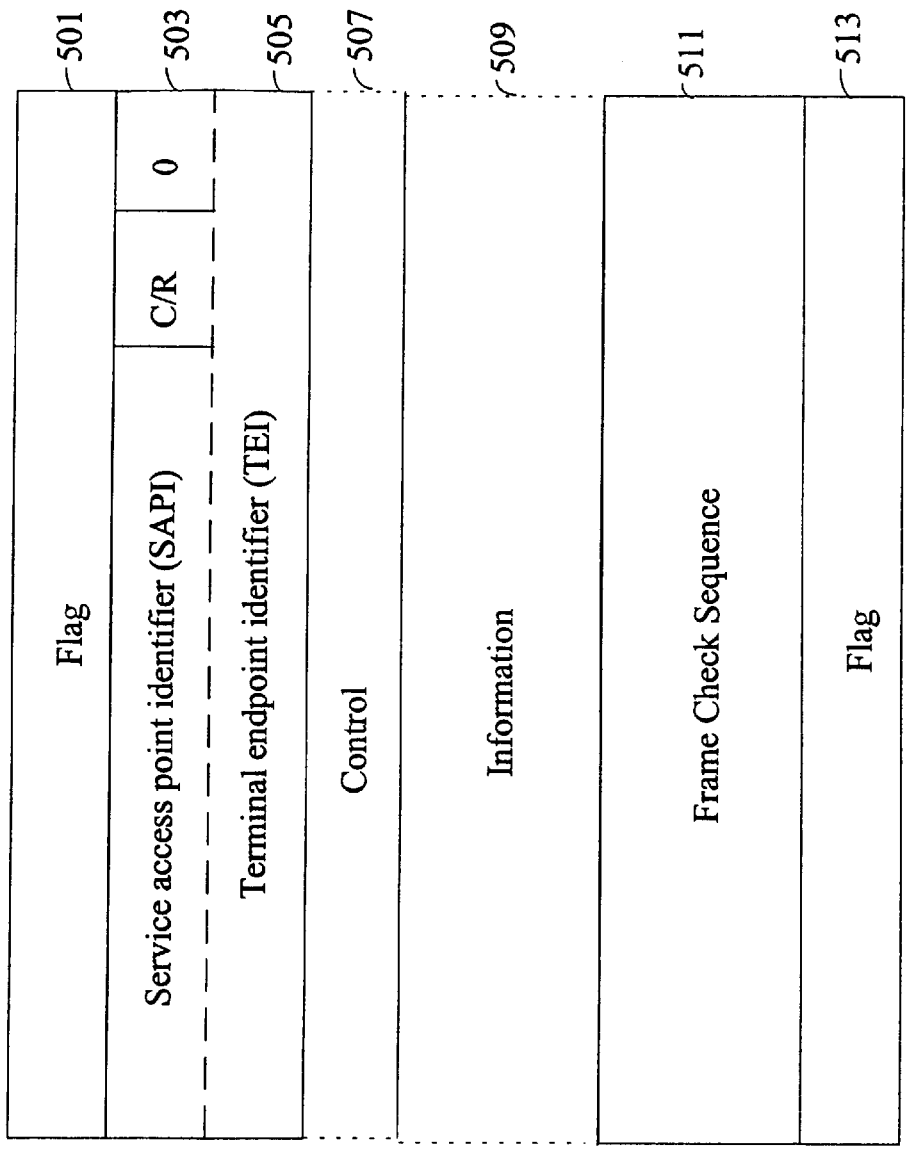
FIG. 3 is a conventional link access protocol, D channel message format for a conventional setup message using a I.451/Q.931 message structure.
Figure 7:
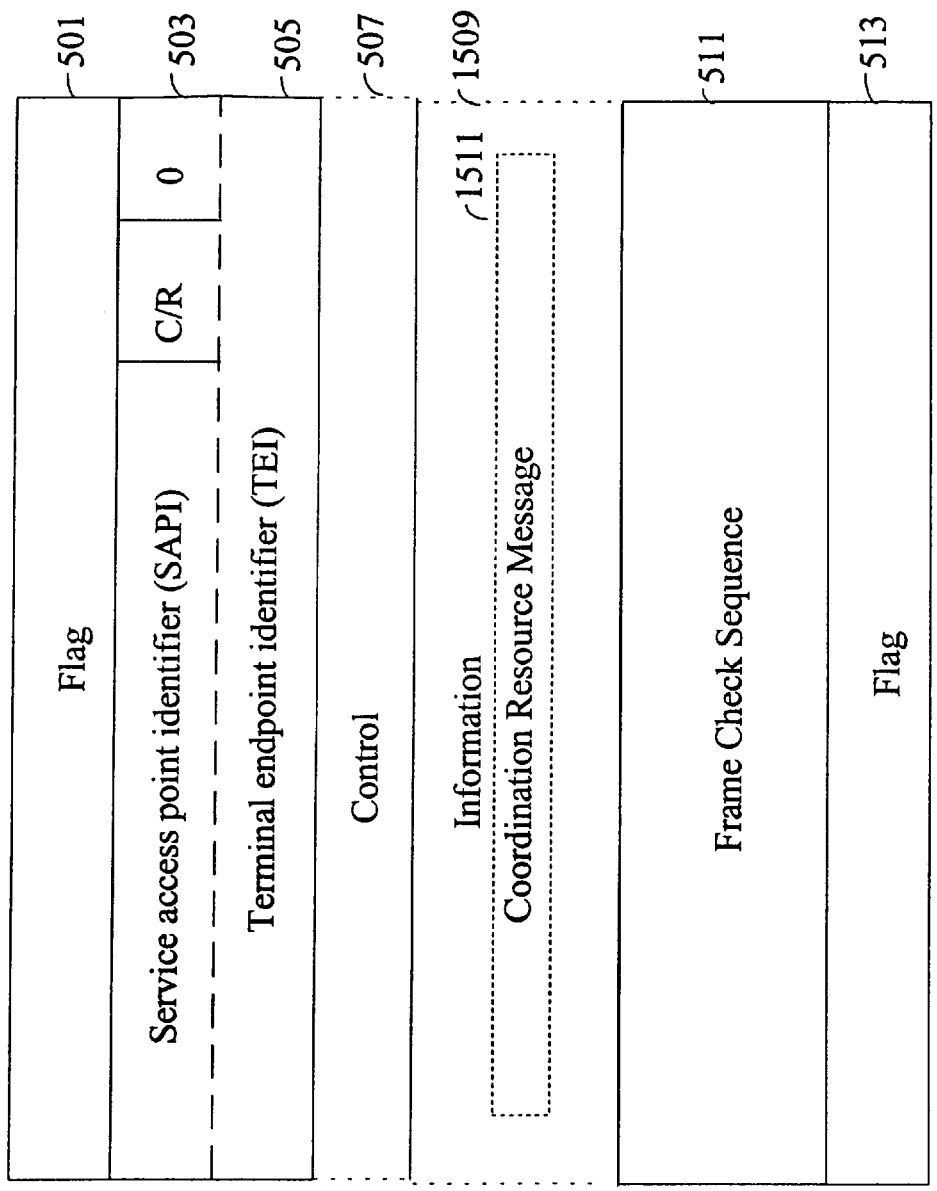
FIG. 7 is a modified LAPD setup message structure incorporating a coordination resource message according to the present invention.

FIG. 7 shows the LAPD frame structure for a setup message that is formed by the source terminal 100, stored in RAM 295, and subsequently sent via the system bus 270 to the terminal adapter 10A and then to the ISDN switch 220. A difference between the frame structure of that shown in FIG. 7 from that shown in FIG. 3, is that the information frame 1509 (of FIG. 7) includes a coordination resource message 1511. This coordination resource message 1511 includes parameters stored in the source facsimile 100 and included in the resource message sent to the ISDN terminal 220 so that the processor 24 in the ISDN switch 220 can make a determination regarding the optimum communication attributes between the source terminal 100 and destination terminal 160. Alternatively, the source terminal 100, rather than including in the coordination resource message 1511 a listing of the communication attributes of the source terminal 100, may also include a list of desired communication attributes of a destination terminal 160, to which the source terminal 100 would be compatible. As previously discussed, the setup message including the LAPD frame shown in FIG. 7, will be sent from the source terminal 100 to the ISDN switch 220 during a call setup, and the processor 24, will then establish a query message sent to the destination 160, querying the destination terminal 160, regarding communication attributes of the destination terminal 160. In this context then the processor 24 in the ISDN switch 220 provides simultaneous D channel connections between the source terminal 100 and destination terminal 160, prior to establishing and allocating B channel resources for the communication system. As alternatives, the decision process for identifying the common attributes may be moved to either the source terminal 100 or destination terminal 160.

Figure 8:
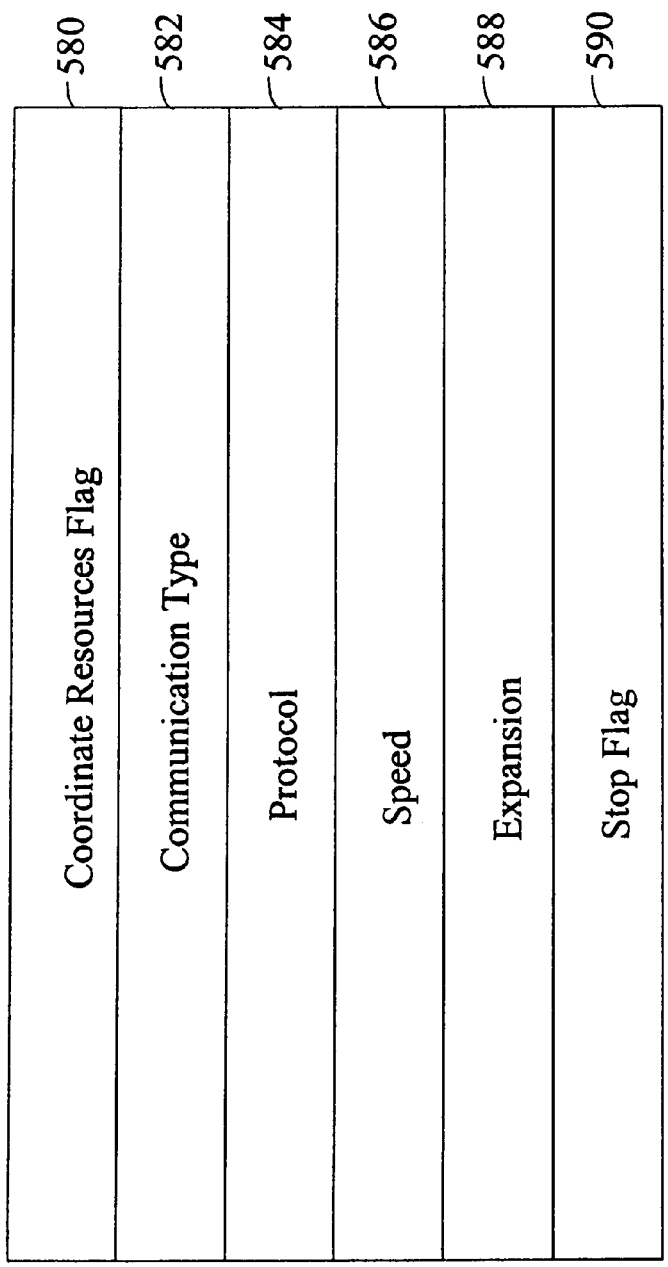
FIG. 8 is a block diagram of a coordination resource message as shown in FIG. 7.

FIG. 8 shows exemplary frames employed in the coordination resource message, as was shown in FIG. 7. The reply message from the destination terminal 160 is similarly structured. In a first frame, included in one octet, or alternatively multiple octet blocks, as will be discussed, a coordinate resource flag 580 is included which identifies a specific code associated with reporting that the following frames will include communication attributes.

Following the coordination resource flag is a "communication type" frame 582, which indicates whether synchronous or asynchronous communications are available in the source terminal 100. Subsequently, a "protocol" frame 584 is included which indicates a type of protocol desired, such as Modified G3 (IDI), VT (Val-U-Teac), MIL-STD 161A, B, C, or other. A "speed" frame 586 follows the protocol frame 584, and indicates a set of speeds at which the source terminal 100 may operate. Accordingly, the speed frame 586 may include multiple frames if more than $2^5$ (i.e., as will be discussed with respect to FIG. 11) possibilities exist. Frame 588 is held for expansion purposes and may be included to identify other communication attributes and parameters that may be important in optimizing a communications protocol. Finally, a stop flag 590 is included at the end of the coordination resource message indicating to the processor 24, and in particular the central resource coordination mechanism 106, that the coordination resource message is complete.

Figure 9:
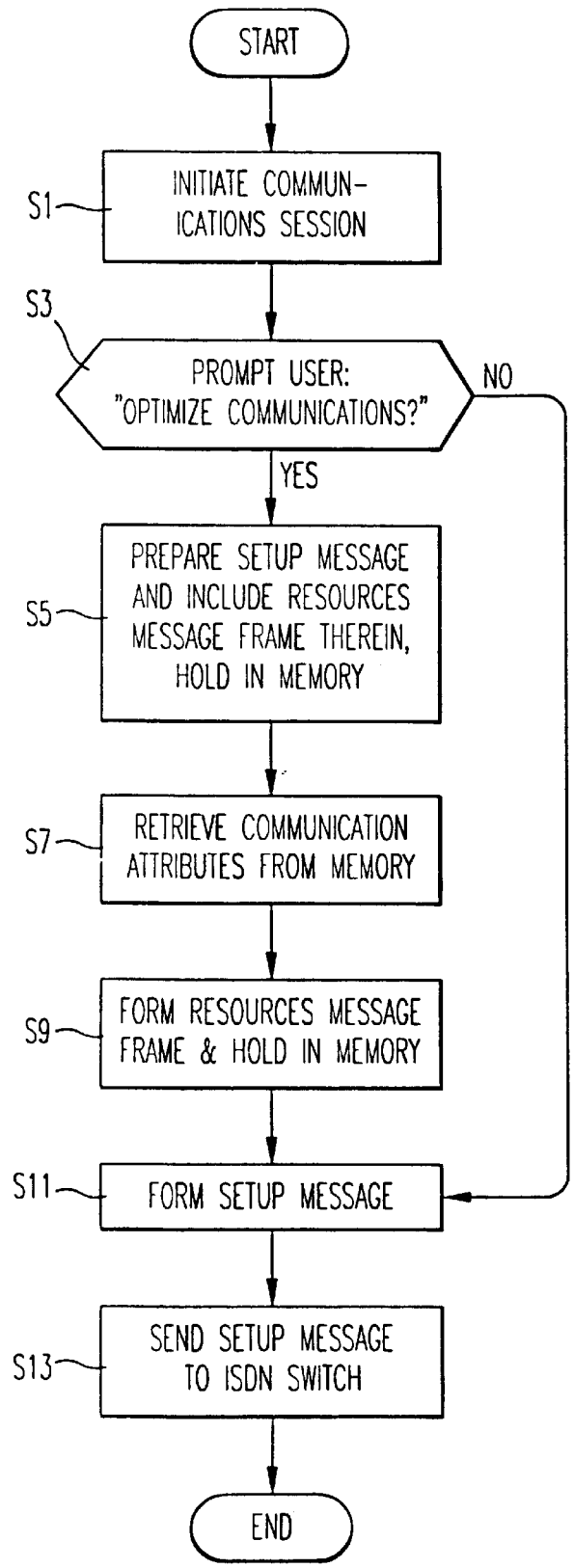
FIG. 9 is a flowchart of a method for initiating an optimized ISDN communication 5 according to the present invention.

FIG. 9 is a flowchart of a process implemented by the resource coordination mechanism 102 in the source terminal 100 for forming a setup message which includes the coordination resource message 1511 in FIG. 7. The process begins in step S1 where a user initiates a communication session by pressing either the start button 276, or particular digits on the keypad 275 for inputting a destination terminal telephone number. In response, the resource coordination mechanism 102 prompts the user in step S3 for whether the user wishes to "optimize communications". If the response to the query in step S3 is negative, the process proceeds to step S11, where the source terminal 10 prepares a setup message without the coordination resource message 1511 of FIG. 7. However, if the response in step S3 is affirmative, the process proceeds to step S5 where the resource coordination mechanism begins to prepare a setup message by allocating a resource message frame therein and storing the message in memory. Subsequently, the process proceeds to step S7, where the communication attributes associated with the source terminal 110 are retrieved from the RAM 295, or alternatively ROM 290 if they are factory-set attributes.

The process then proceeds to step S9 where the resource coordination mechanism 102 forms the resource message frame with the communication attribute frames and holds the same in the RAM 295. The process then proceeds to step S11, where the entire setup message is formed so as to include the resource message. Subsequently, the process proceeds to step S13 where the source terminal 100 sends the setup message to the ISDN switch 220. The process then ends.

Optionally, the terminal adapter, or controller in the resource coordination mechanism 102 at the source terminal 100, is able to identify and optimize set up parameters for communicating based on user selected features associated with the facsimile message to be transferred. For example, with regard to different resolutions, the communication parameters may be adjusted, according to whether a standard, detailed, fine, or super-fine image selection is chosen. Furthermore, another selection parameter based on the type of image that is to be conveyed is based on the number of shades (e.g., gray scales for example) that are used in the facsimile image. Three gradations of shading include half-tone shading, dithering shading, high intensity image shading. In addition, an unallocated measurement may be included for future expansion. Color options are communications loading considerations, where an increased communication capacity demand is imposed with more color selections. The selection of image parameters will be influenced on the amount of time allocated, either set automatically or perhaps as a user entered indicator, when conveying the information within a certain predetermined time-frame to the destination terminal. Of course, the communication attributes of the destination terminal may be the limiting constraint regarding the rate at which the facsimile message may be conveyed optimally to the destination terminal. Thus, if the available time or communications capacity is relatively limited, or the destination terminal is unable to accept high resolution, multi-color images, then the image attributes may be reduced to allow for efficient and timely communication of the image.

Figure 10:
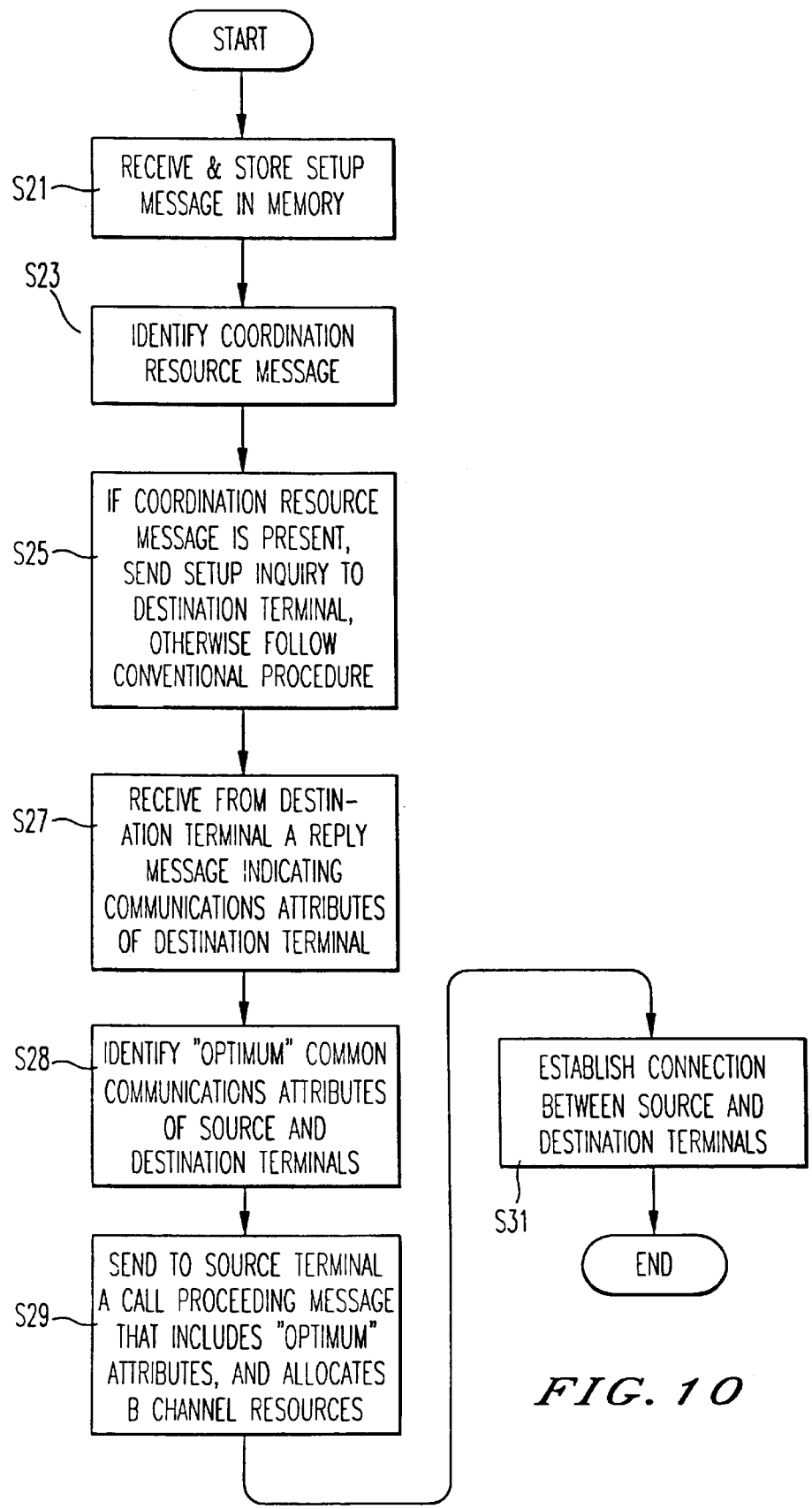
FIG. 10 is a flowchart of a process implemented in the ISDN switch facilities for identifying and coordinating communication resources for subsequent allocation to the source and terminals according to the present invention.

FIG. 10 is a flowchart of a process implemented in the central resource coordination mechanism 106 that is hosted on the processor 24 of the ISDN switch 220. The central resource coordination mechanism 106 is preferably implemented as a computer-based process, where specific data structures are held in RAM accessible by the processor 24.

The process in FIG. 10 begins in step S21, where the processor 24 receives and stores the setup message in RAM. The processor 24 then analyzes the setup message in step S23, where it is determined whether a coordination resource message is identified in the setup message. The process proceeds to step S25 where, if the coordination resource message is identified in the setup message, the central resource coordination mechanism 106 sends a setup inquiry that requests the destination terminal 160 to furnish communication attributes to the ISDN switch 220 in a reply message. However, if the coordination resource message is not identified in step S23, the process in step S25 proceeds without further coordination between the source terminal 100 and destination terminal 160 for optimizing communications therebetween. When the setup inquiry is sent to the destination terminal 160, the process proceeds to step S27, where the destination terminal 160 sends a reply message indicating the communication attributes of the destination terminal 160. Subsequently, the process proceeds to step S28, where the central resource coordination mechanism 106, identifies the "optimum" common communication attributes of the source terminal 100 and the destination terminal 160. The process then proceeds to step S29, where the central resource coordination mechanism 106 informs the source terminal 100 via a call proceeding message that includes the "optimum" attributes so that the source terminal 110, may then employ the optimum attributes and subsequently communicate with the destination terminal 160 over the B channel. The process then proceeds to step S31, where the central resource coordination mechanism 106 makes available the optimum conditions to the processor 24, and the processor 24 allocates the appropriate B channel resources to the source terminal 100 and the destination terminal 160. Subsequently, the process ends, however, the D channel coordination between the switch 220 and the source and destination terminals (100, 160) continues on the D channel, and communication between the source terminal 100 and destination terminal 160 continues.

Figure 11:
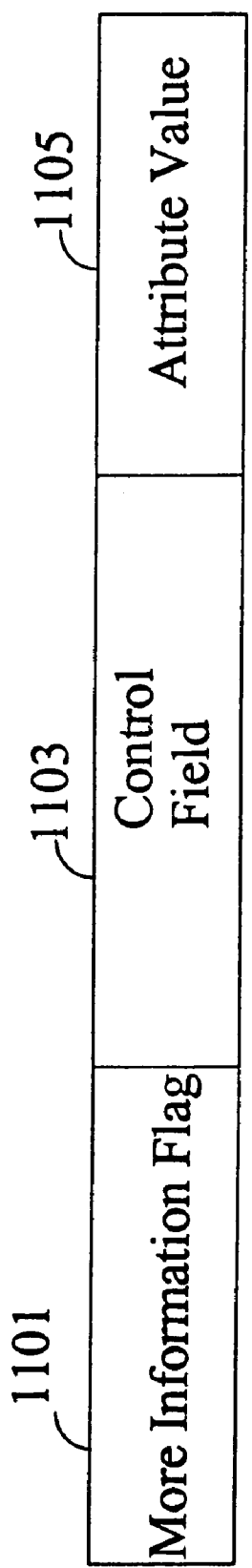
FIG. 11 is a data structure of particular communication resources as identified in messages as shown in FIG. 8.

FIG. 11 shows the form of a data structure of an individual frame held in the memory of the resource coordination mechanism 102 when forming the original setup message, and as held in memory when received by the switch 220 More particularly, the data structure of FIG. 11 applies to the structure of the respective frames shown in FIG. 10. The frame shown in FIG. 11 includes three subframes, or alternatively may include three separate octet frames or even longer frames if necessary. In particular, the preferred approach as shown in FIG. 11 is to use a single octet frame, where the first subframer 1101, indicates whether the present frame is sufficient for the present attribute, or if additional frames are necessary for completely characterizing the present attribute. The control field 1103, provides a control message, indicative of a communication parameter to be optimized. The subfield 1105 holds an attribute value associated with the attribute identified in a control field 1103. For example, suppose the present frame is intended to hold a synchronous versus asynchronous communication attribute, the first subframe 1101 will hold a value of "0", indicative that the present frame is the only frame identifying the attribute, the control subframe 1103, holds two bits "01", representative of the synchronous/asynchronous communication parameter. The attribute value subframe 1105 holds the value "00011", indicative that the source terminal 100 is capable of communicating in either an asynchronous or synchronous mode.

Figure 12:
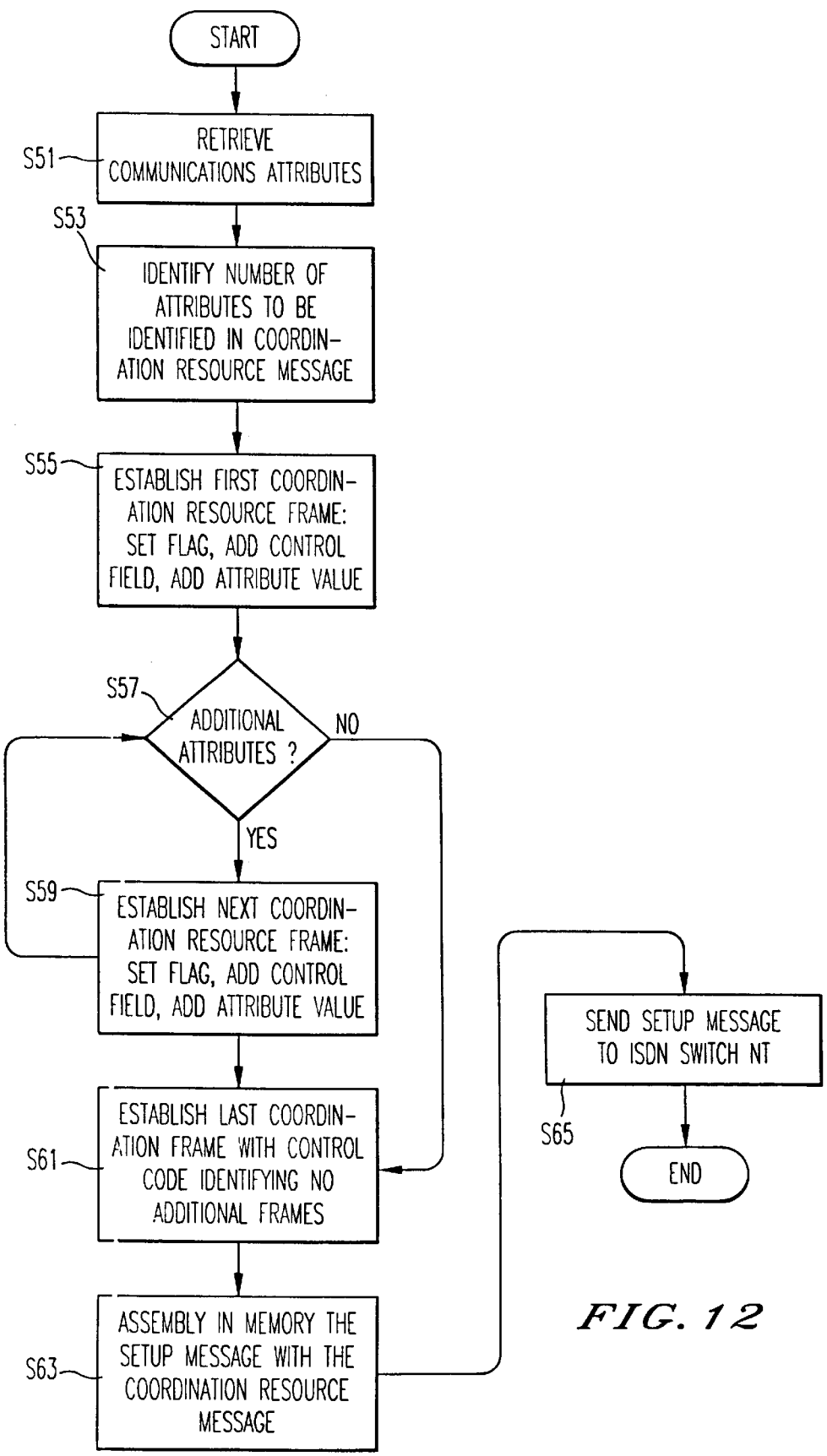
FIG. 12 is a flowchart of a method for forming a coordination resource message at a source terminal or destination terminal.
Figure 13:
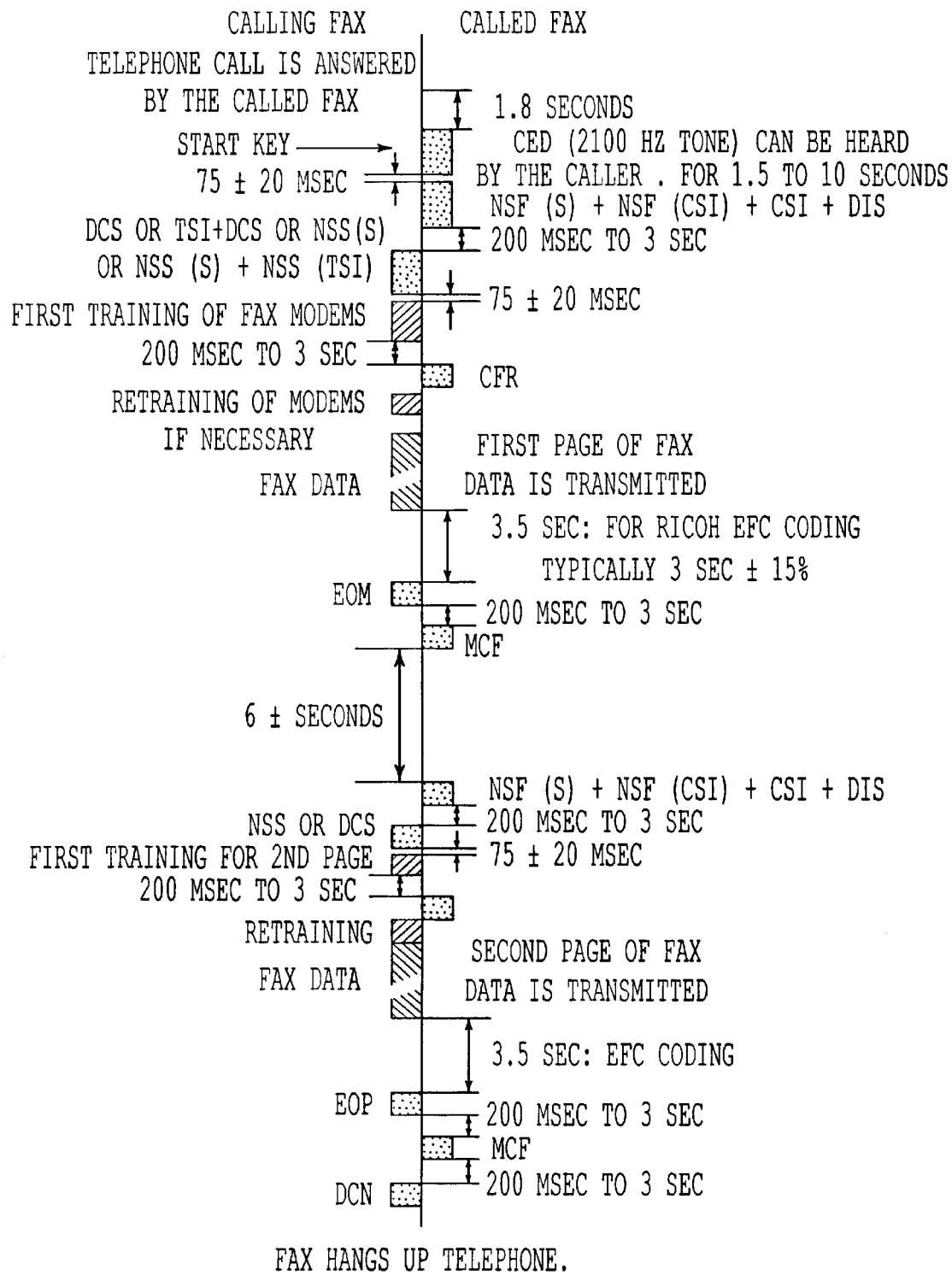
FIG. 13 is a conventional-calling sequence between a calling facsimile device and a called facsimile device, that employs the G3 T30 protocol in a conventional telephone network.
Figure 14:
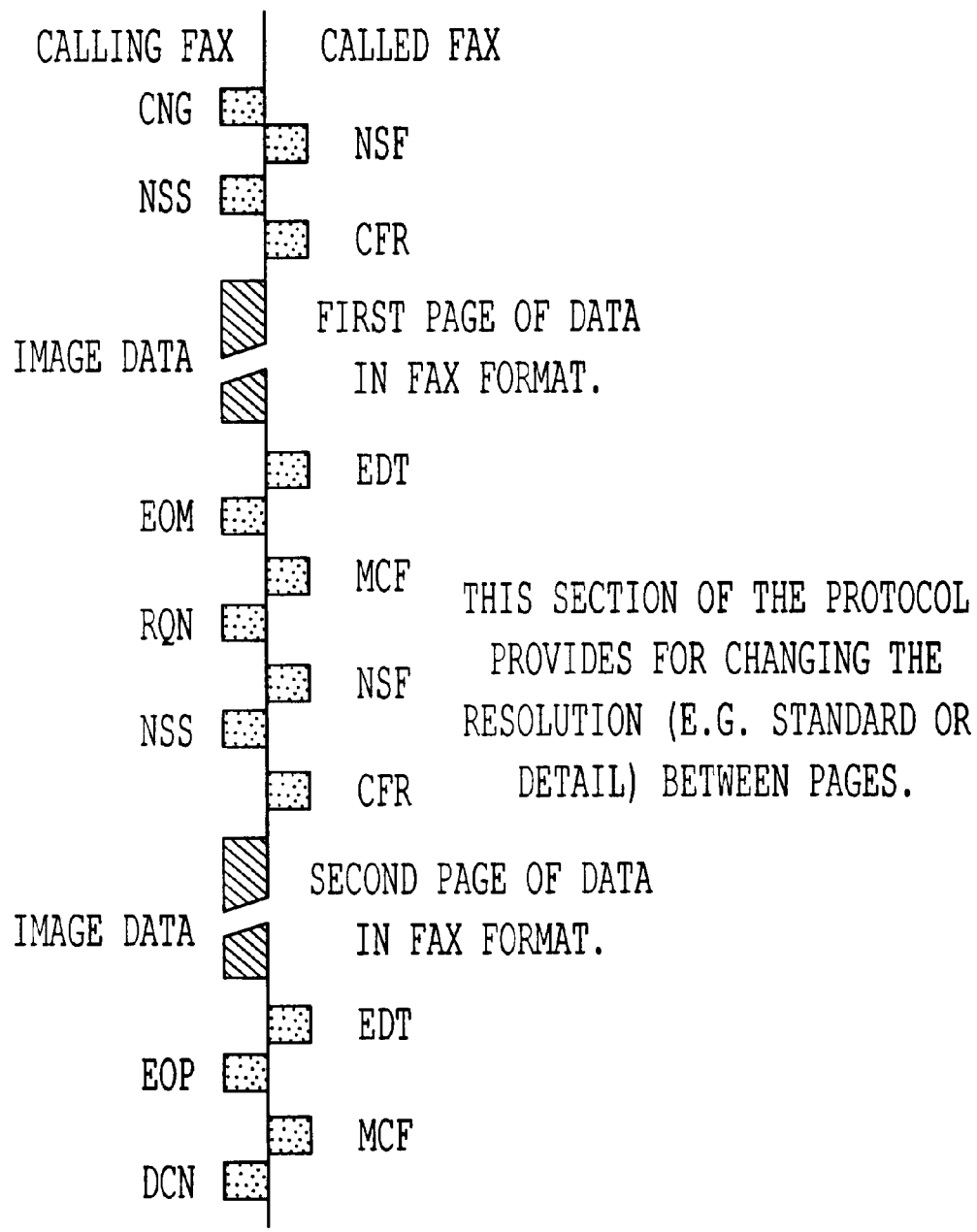
FIG. 14 is an exemplary protocol between a calling facsimile device and a called facsimile device when the communication results in returning to an idle mode of operation.
Figure 17A:
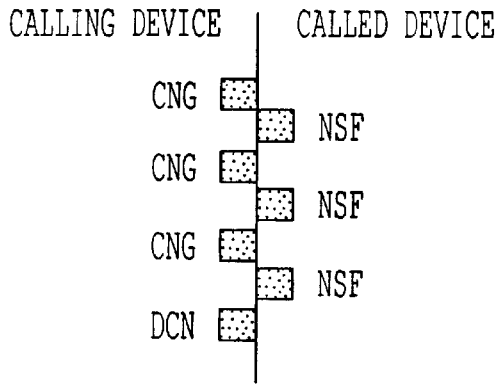
FIGS. 17A–17c correspond with command exchange sequences for error conditions.
Figure 17B:
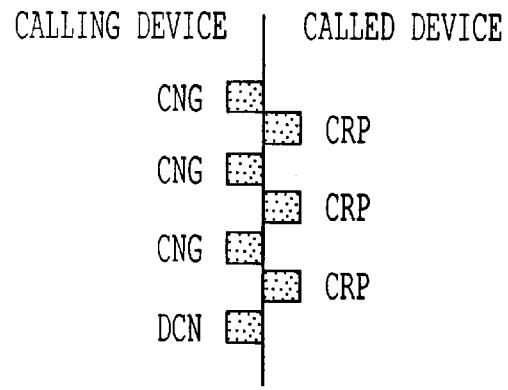
Figure 17C:
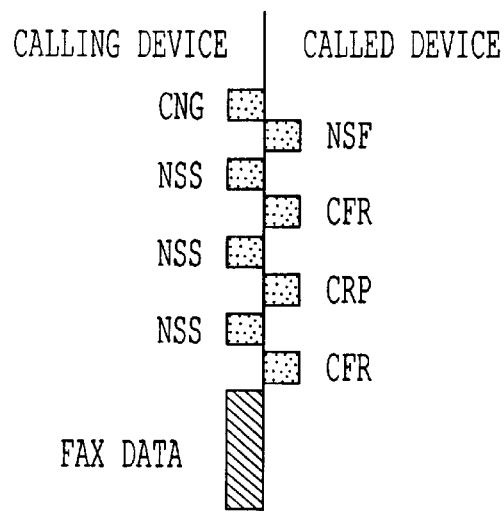

FIG. 12 is a flowchart identifying a process implemented in the resource coordination mechanism 102 of the source terminal 100. The process of FIG. 12 is employed when assembling the frames shown in FIGS. 8 and 11 that, in the aggregate, form the coordination resource message 1511 of FIG. 7. The process begins in step S51 where the attributes are retrieved from memory (consistent with step S7 in FIG. 9). The process then proceeds to step S53 where a number of the attributes are identified in the coordination resource message. The process then proceeds to step S55, where a first coordination resource frame (such as that shown in FIG. 11) is formed by setting the flag, adding a control field, and adding an attribute value associated with the communication attribute that is included in the frame. The process then proceeds to step S57, where an inquiry is made regarding whether additional attributes are present. If the response to the inquiry in step S57 is negative, the process proceeds to step S61 where the resource coordination mechanism 102 establishes the last coordination frame with a final control code indicating an end of message flag such as that in frame 513 of FIG. 7. However, if the response to the inquiry in step S57 is affirmative, the process proceeds to step S59, where a next coordination resource frame is formed by setting a flag, adding the appropriate control subframe and attribute value associated with the communication attribute. The process then returns to step S57, where the inquiry is made regarding whether there are additional attributes or not.

When the negative inquiry is received in step S57, the process proceeds to step S61, where, as discussed above, the last coordination frame is formed. Subsequently, the process proceeds to step S63 where the setup message is assembled in memory, along with the coordination resource message (where the steps S53, S55, S57, S59, S61 and S63 are substeps of step S9 in FIG. 9). The process then proceeds to step S65 (consistent with step S13 of FIG. 9), where the setup message is sent to the ISDN switch 220 and then the process ends.

Figure 18:
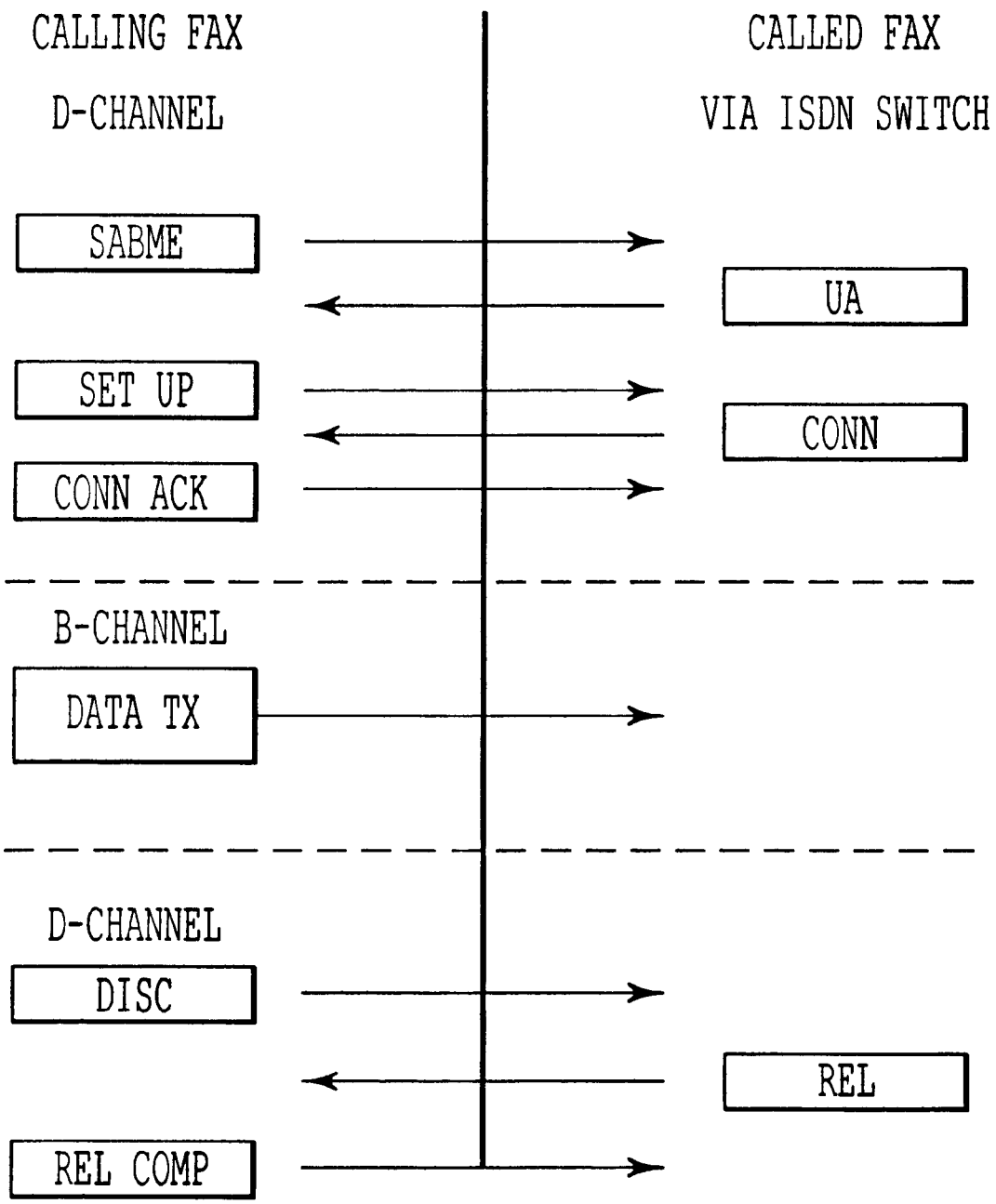
FIG. 18 is a signaling protocol sequence between a calling facsimile device in a called facsimile device via a ISDN switch, directed to an asynchronous mode of communication, with automatic parameter inclusion.

FIG. 18 shows a signaling sequence between a source terminal and destination terminal (referred to as calling fax and called fax respectively in FIG. 18) in an automatic mode using asynchronous communications. The protocol is initiated with a request to the called facsimile via the ISDN switch, in an SABME message, indicative of a request to establish communications over the B channel signal. The called fax returns a response message, referred to as "UA" message, indicating that the called fax is available for communication. Alternatively, the ISDN switch makes the determination for the called fax that the called fax is available to begin communications. Once the calling fax recognizes that the called fax is available for communications, the calling fax sends over the D channel a setup message. The setup message in the D channel will have all the information about the asynchronous communication connection that is to be established, such as with an IDI protocol for example. The setup message will have all of the parameters defined regarding the requested communication to be established and the associated capabilities of the calling fax. The called fax, perhaps by way of the ISDN switch, responds with a connect message that informs the calling fax of the communication features and attributes of the calling fax machine. The called fax first compares attributes of the called fax with those requested by the calling fax in the setup message and provides either an agreement to certain features proposed by the calling fax, or proposes a set of communication attributes and functional features that the called fax perceives as being optimum for the communication. In reply, the calling fax sends an acknowledged message to the called fax, confirming the communication attributes that are to be used when the B channel is to be used for transmitting the data by way of the ISDN switch. In reply to the connected knowledge, the ISDN switch makes available all or a portion (or multiple) B channels for the transmission of the data from the calling fax to the called fax. At the conclusion of the transmitted data, the calling fax informs the called fax that the calling fax would like to disconnect the line and the called fax replies with a release message indicating that the called fax releases the line. In reply, the calling fax sends a release complete indication and the communications session terminates.

Figure 19:
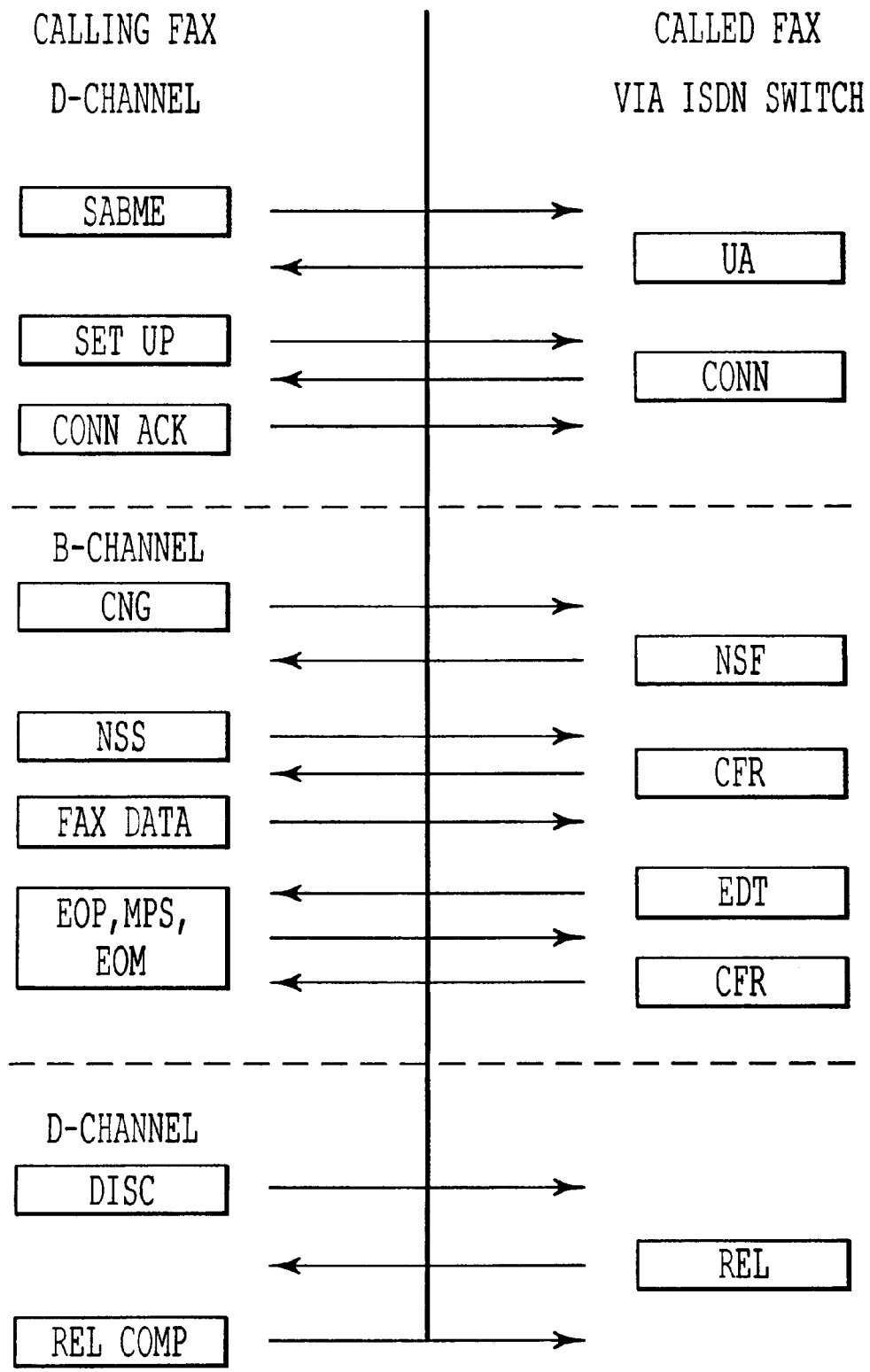
FIG. 19 is another asynchronous signaling protocol between a calling facsimile device and a called facsimile device via an ISDN switch, where the asynchronous communication is operated in a non-automatic mode.

FIG. 19 is directed to a calling sequence, like that of FIG. 18, but directed to a non-automatic mode, referred to as a "manual" mode. The initial coordination phase on the D channel is virtually the same as the case previously discussed in the automatic mode, with the exception being that the coordination process regarding attributes is not necessarily performed automatically, unless a manual override is included. More typically in the manual mode of operation the calling fax informs the called fax of the communication attributes to be used in the asynchronous communications. For example, the setup message is more instructive, rather than of a request type nature, informing the called fax of the communication attributes to be employed in the asynchronous communication there between. The user may specify these communication (and image) attributes at the calling facsimile device. Subsequently, once the B channel is assigned and activated, a more bi-directional communication protocol is employed, as is seen with regard to the use of the calling command (CNG) and non-standard facilities (NSF) messages sent between the calling fax and the called fax. At the conclusion of the B channel communications session, after receiving an end of message (EOM) indication, the called fax replies with a confirmation to stand by to receive message (CFR) message which informs the calling fax that the calling fax may use the D channel to disconnect the communications session between the calling fax and the called fax.

Figure 20:
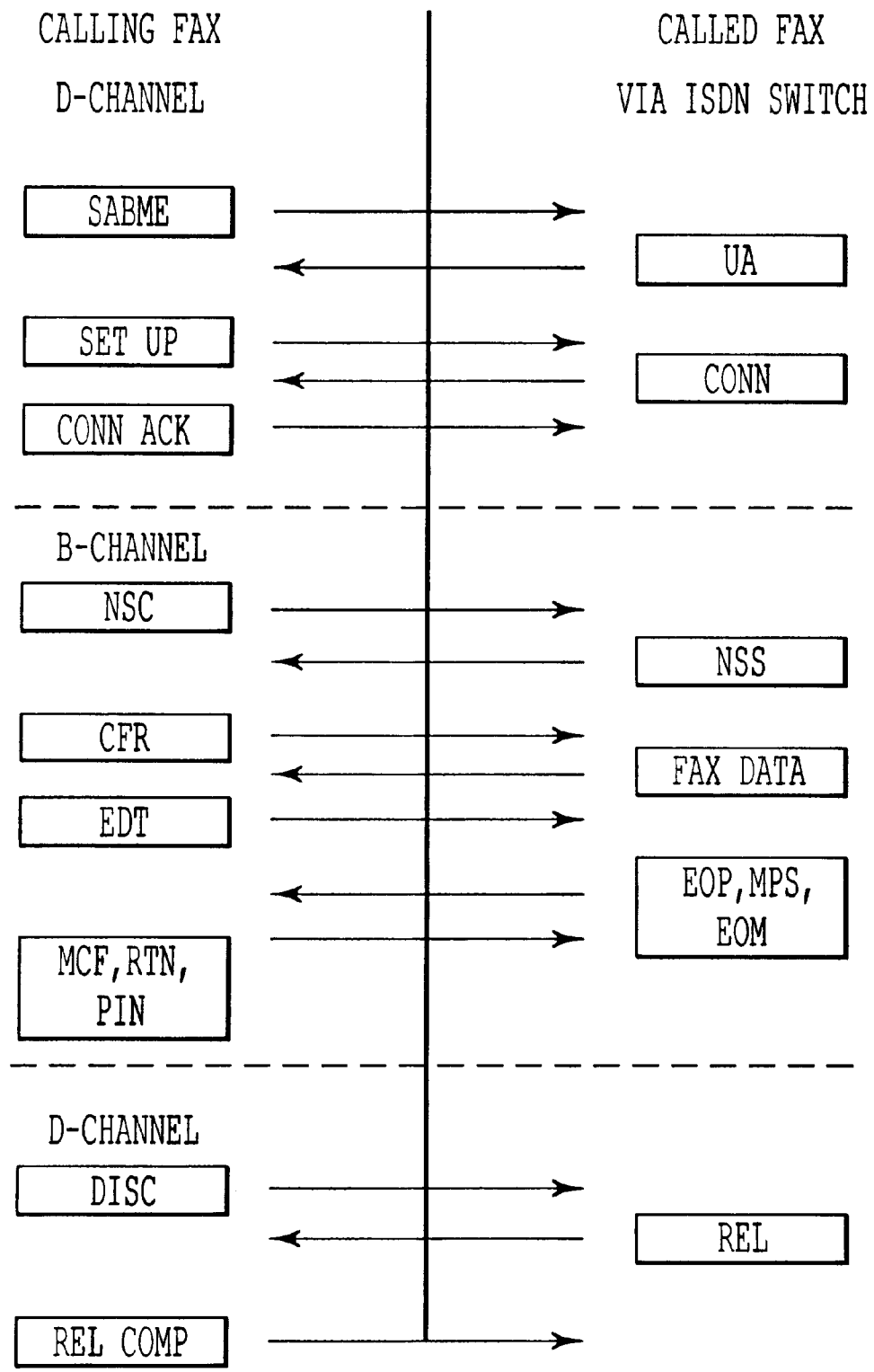
FIG. 20 is another signaling sequence between a calling facsimile device and a called facsimile device via an ISDN switch, where the communication is an asynchronous polling communication, that is performed in a non-automatic mode.

FIG. 20 is directed to a communication session between the calling fax and the called fax, using an asynchronous polling mode of operation with the manual mode. As seen, the initial coordination between the calling fax and the called fax over the D channel is the same as the case with FIGS. 18 and 19. However, once the B channel is established, the machine function settings of the calling device are sent to the called device so that the called device may reply with a non-standard facility set up message (NSS), which ultimately permits facsimile data from the called fax to be transmitted to the calling fax in a communications session. After the called fax informs the calling fax that the end of message has arrived, the communications session on the B channel is closed and subsequently coordination of the D channel completely terminates the communication between the calling fax and the called fax.

Figure 21:
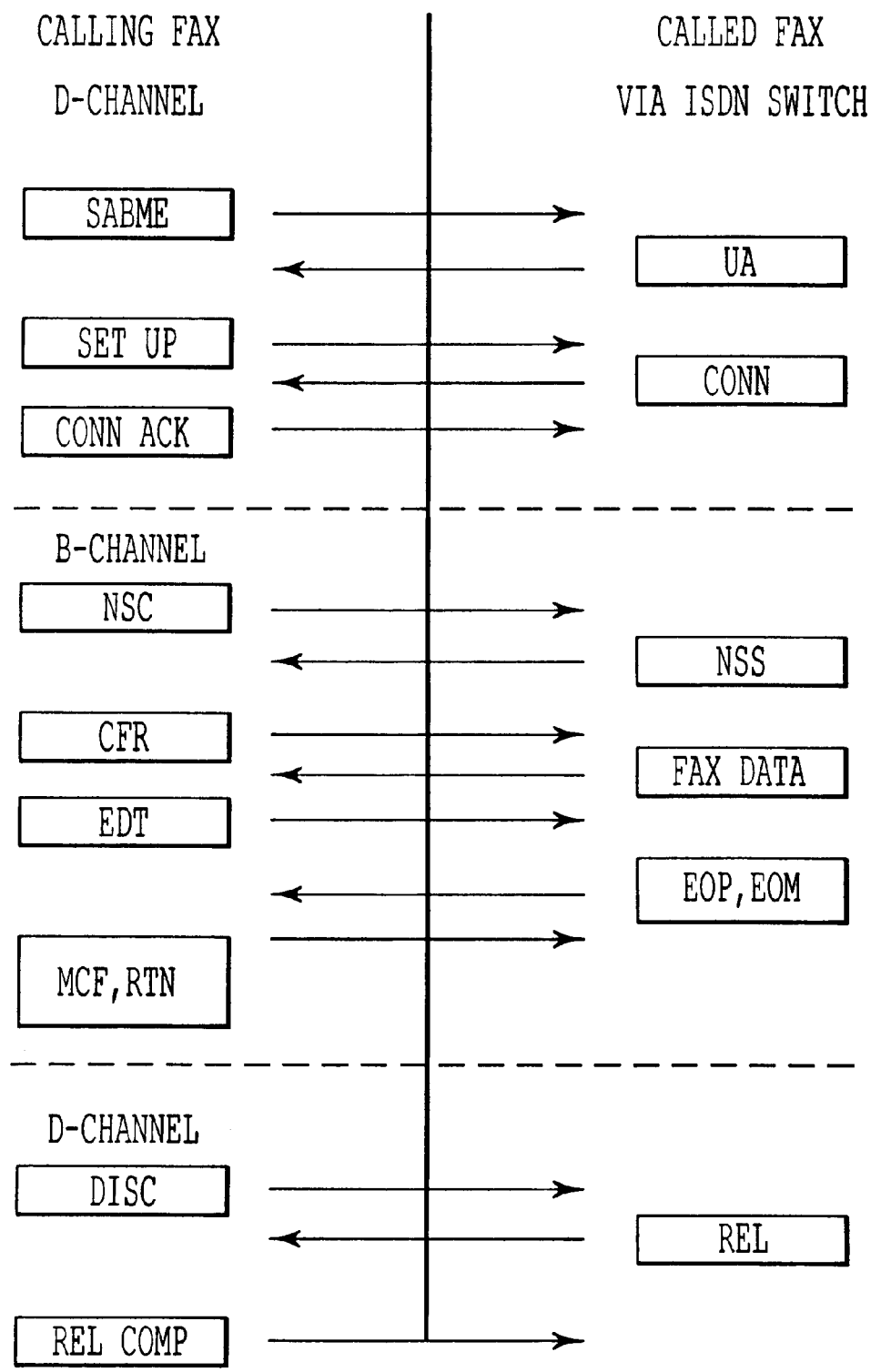
FIG. 21 is a signaling sequence between a calling facsimile device and a called facsimile device via an ISDN switch, in a nonautomatic asynchronous turn around polling operation.

FIG. 21 is similar to the calling sequence shown in FIG. 20 although the procedure being performed is an asynchronous turn around polling operation, rather than a conventional polling operation.

The mechanisms and processes set forth in the present description may be implemented using a conventional general purpose microprocessor programmed according to the teachings in the present specification, as will be appreciated to those skilled in the relevant art(s). Appropriate software coding can readily be prepared by skilled programmers based on the teachings of the present disclosure, as will also be apparent to those skilled in the relevant art(s).

The present invention thus also includes a computer-based product which may be hosted on a storage medium and include instructions which can be used to program a computer to perform a process in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed is as new and is desired to be secured by Letters Patent of the United States is:

1. An apparatus in an integrated services digital network computer-based system that identifies common communication attributes of a destination terminal and a source terminal, prior to establishing an asynchronous communication link between the source terminal and destination terminal, said apparatus comprising:

the source terminal, having,
  a source processor,
  a source memory accessible to the source processor, said source memory configured to hold a source terminal program that when executed by the source processor forms an ISDN setup message having a coordination resource message contained therein, said source memory being configured to hold source terminal communication attributes for inclusion in said coordination resource message, and
  a source terminal interface configured to be coupled to an ISDN switch using an asynchronous protocol and adapted to send said coordination resource message to said ISDN switch, wherein
said coordination resource message provides said ISDN switch with said source terminal communication attributes so that said ISDN switch is informed of the source terminal communication attributes for comparison with the destination terminal communication attributes prior to establishing said communications link.

2. The apparatus of claim 1, further comprising:
the ISDN switch comprising,
  a first switch interface coupled to said source terminal interface and adapted to receive said setup message with said coordination resource message from said source terminal,
  a second switch interface coupled to said destination terminal,
  a switch processor,
  a switch memory accessible to said switch processor, said switch memory configured to hold a central resource coordination program that when executed by said switch processor identifies the source terminal communication attributes in the coordination resource message, and forms an inquiry signal that is sent to said destination terminal via said second switch interface, said processor when executing said central resource coordination program being configured to identify said destination terminal communication attributes contained in a reply message sent with the asynchronous protocol from the destination terminal to the second switch interface, and identifies said common attributes.

3. The apparatus of claim 2, wherein:
the ISDN set up message initiates at least one of a normal call initiation and a polling call initiation.

4. The apparatus of claim 3, further comprising:
said destination terminal comprising,
  a destination terminal processor,
  a destination terminal memory accessible to said destination terminal processor and configured to hold the destination terminal communication attributes, and
  a destination terminal interface coupled to said second switch interface and configured to receive said inquiry message therefrom, wherein
said processor comprises a response mechanism configured to send the reply message to said switch in response to said inquiry message, said reply message containing said destination terminal communication attributes when in said normal operation mode.

5. The apparatus of claim 3, wherein:
said destination terminal communication attributes include an indication regarding whether the destination terminal is configured to be polled using a predetermined analog bandwidth call on an ISDN D channel.

6. The apparatus of claim 1, wherein:
said coordination resource message includes a command frame containing a type of data to be sent in a forthcoming data frame.

7. The apparatus of claim 6, wherein:
said coordination resource message includes parameters indicating a data compression method used to compress the data, and image resolutions.

8. The apparatus of claim 1, wherein said source terminal is configured to send information in a normal mode of operation that informs said destination terminal of an apparatus identification, said apparatus identification being informative of whether the source terminal has communication parameter negotiation capabilities.

9. The apparatus of claim 4, wherein said source terminal and said destination terminal are configured to determine if subsequent data frames exist in a transmission and whether image parameters are to be changed in a subsequent frame.

10. The apparatus of claim 1, wherein said source terminal is configured to be polled.

11. A device in an integrated services digital network computer-based system that identifies common communication attributes of a destination terminal and a source terminal, prior to establishing an asynchronous communication link between the source terminal and destination terminal, said device comprising:
the destination terminal; and
the source terminal, comprising,
  a source processor,
  means for holding a source terminal program for execution by the source processor and for holding source terminal communication attributes,
  means for forming an ISDN setup message and with a coordination resource message contained therein and for including said source terminal communication attributes in said coordination resource message,
  source terminal interface means for sending said setup message with said coordination communication message to an ISDN switch using an asynchronous protocol having command frames and data frames that have a one-to-one correspondence with frames sent by the destination terminal; and
  means for confirming receipt of at least one of said command frames and said data frames, wherein
said coordination resource message informs said ISDN switch of the source terminal communication attributes for comparison with destination terminal communication attributes prior to establishing said communications link.

12. The apparatus of claim 11, wherein:
said means for forming an ISDN setup message comprises means for forming said coordination communication message to include a frame having a data structure that includes a control field indicative of a communication attribute, and an attribute value field indicative of a value associated with the communication attribute.

13. The device of claim 12, further comprising:
means for identifying a number of attributes to be identified in said coordination resource message;
means for establishing a first coordination resource frame containing at least one of said source terminal communication attributes, said first coordination frame being included in said coordination resource message;
means for inquiring whether additional frames are to be transmitted and establishing a second coordination resource frame when an additional frame containing another of said source terminal communication attributes is indicated as being transmitted as part of said coordination resource message;

means for establishing a last coordination resource frame containing a parameter indicating that no more coordination resource frames are to be transmitted; and means for assembling the setup message so as to contain the coordination resource message.

14. A method performed in an integrated services digital network computer-based system for identifying common communication attributes of a destination terminal and a source terminal, when establishing an asynchronous communication link between the source terminal and destination terminal, comprising the steps of:

holding in memory a source terminal program for execution by a source processor and holding the source terminal communication attributes therein;

forming an ISDN setup message and with a coordination resource message contained therein and including said source terminal communication attributes in said coordination resource message;

sending said setup message with said coordination communication message to an ISDN switch using an asynchronous protocol; and informing said ISDN switch by said coordination resource message of the source terminal communication attributes for comparison with destination terminal communication attributes prior to establishing said communications link.

15. The method of claim 14, wherein:

said step of forming an ISDN setup message comprises forming said coordination communication message to include a frame having a data structure that includes a control field indicative of a communication attribute, and an attribute value field indicative of a value associated with the communication attribute.

16. The method of claim 14, further comprising the steps of:

receiving said setup message with said coordination resource message from said source terminal; and executing a central resource coordination program held in memory, comprising, identifying the source terminal communication attributes in the coordination resource message, forming and sending an inquiry signal to said destination terminal via said second switch interface, and identifying said destination terminal communication attributes in a reply message sent from the destination terminal, and identifying attributes that are common to said source terminal and said destination terminal.

17. The method of claim 16, further comprising the step of:

allocating at least a portion of a B communications channel between said source terminal and said destination terminal based on said common attributes.

18. The method of claim 15, further comprising the steps of:

identifying a number of attributes to be identified in said coordination resource message;

establishing a first coordination resource frame containing at least one of said source terminal communication attributes, said first coordination frame being included in said coordination resource message;

inquiring whether additional frames are to be transmitted and establishing a second coordination resource frame when an additional frame containing another of said source terminal communication attributes is indicated as being transmitted as part of said coordination resource message;

establishing a last coordination resource frame containing a parameter indicating that no more coordination resource frames are to be transmitted; and assembling the setup message so as to contain the coordination resource message.

19. The method of claim 14, wherein said forming step includes forming the ISDN set up message by manually identifying the source terminal communication attributes.

20. The method of claim 14, wherein said forming step includes forming the ISDN message automatically.

* * * * *